United States Patent [19]

Willis

[11] Patent Number: 5,372,317
[45] Date of Patent: Dec. 13, 1994

[54] APPARATUS FOR RECYCLING GLASS CONTAINERS

[76] Inventor: W. Coy Willis, 1562 Idlewild Dr., Richmond, Ind. 47374

[21] Appl. No.: 87,450

[22] Filed: Jul. 9, 1993

Related U.S. Application Data

[62] Division of Ser. No. 741,939, Aug. 8, 1991.

[51] Int. Cl.$^5$ .................. B02C 19/12; B02C 17/14
[52] U.S. Cl. .................... 241/99; 241/140; 241/264
[58] Field of Search ............ 241/99, 140, 264, 267, 241/268, 269, 300, DIG. 30

[56] References Cited

U.S. PATENT DOCUMENTS

| | | |
|---|---|---|
| 54,884 | 5/1866 | Fowler . |
| 260,064 | 6/1882 | Tasker . |
| 1,004,663 | 10/1911 | Landrum . |
| 1,819,583 | 8/1931 | Winters . |
| 2,028,643 | 1/1936 | Bakstad . |
| 2,094,465 | 9/1937 | Peterson . |
| 2,319,290 | 5/1943 | Beisner ................. 241/240 |
| 2,554,697 | 5/1951 | Conway . |
| 2,821,302 | 1/1958 | Fowler et al. . |
| 2,843,331 | 7/1958 | Reeves . |
| 3,062,131 | 11/1962 | Mankki et al. ............ 241/268 X |
| 3,145,938 | 8/1964 | Pollitz . |
| 3,202,366 | 8/1965 | Harmon ............... 241/268 X |
| 3,241,777 | 3/1966 | Kuntz . |
| 3,462,015 | 8/1969 | Tysver et al. . |
| 3,504,621 | 4/1970 | Qualheim . |
| 3,532,215 | 10/1970 | Davidson . |
| 3,687,062 | 8/1972 | Frank . |
| 3,713,596 | 6/1973 | Hoffman . |
| 3,776,128 | 12/1973 | Morris . |
| 3,790,093 | 2/1974 | McIntyre . |
| 3,916,780 | 11/1975 | Heiser . |
| 3,920,191 | 11/1975 | Bradley ............... 241/DIG. 30 X |
| 4,153,206 | 5/1979 | Haefner et al. . |
| 4,248,389 | 2/1981 | Thompson et al. . |
| 4,261,259 | 4/1981 | Beardslee . |
| 4,285,426 | 8/1981 | Cahill . |
| 4,291,618 | 9/1981 | Heiser et al. . |
| 4,316,410 | 2/1982 | Davis, Jr. . |
| 4,345,679 | 8/1982 | DeWoolfson . |
| 4,358,995 | 11/1982 | Ballo et al. . |
| 4,389,157 | 6/1983 | Bernard, II et al. . |
| 4,424,938 | 1/1984 | Day ................. 241/DIG. 30 X |
| 4,510,857 | 4/1985 | LaBarge et al. . |
| 4,512,253 | 4/1985 | LaBarge et al. . |
| 4,519,307 | 5/1985 | LaBarge et al. . |
| 4,537,361 | 8/1985 | Heimerich . |
| 4,558,775 | 12/1985 | LaBarge et al. . |
| 4,561,820 | 12/1985 | Matheny, III et al. . |
| 4,573,641 | 3/1986 | DeWoolfson et al. . |
| 4,579,216 | 4/1986 | DeWoolfson et al. . |
| 4,579,227 | 4/1986 | Miller . |
| 4,653,627 | 3/1987 | Hampson et al. . |
| 4,691,231 | 9/1987 | Fitzmorris et al. . |
| 4,703,899 | 11/1987 | Lodovico . |

Primary Examiner—Timothy V. Eley
Attorney, Agent, or Firm—Arnold B. Silverman; David V. Radack

[57] ABSTRACT

The apparatus for recycling glass containers comprises an enclosure having at least one customer access opening and a rotatable carousel mounted in the enclosure. The rotatable carousel defines a plurality of glass container receiving recesses for subsequently receiving glass containers through the customer access opening. A fixed platform defining at least two openings underlies the carousel and a scanning means, mounted in the enclosure, is positioned adjacent the carousel for scanning the code markings on the glass container. At least one trap door is provided, the trap door being operatively associated with a first opening in the fixed platform. The scanning means electrically controls the movement of the trap doors so that glass containers, upon rotation of the carousel, will selectively fall through one of the openings in the fixed platform. The apparatus further comprises a glass container engaging device mounted in the enclosure having at least two engaging jaws for independently engaging glass containers passing through the openings. Separate storage bins are provided which underlie each of the engaging jaws for receiving the engaged glass containers therefrom. Two embodiments of a glass container engaging device are also disclosed.

14 Claims, 16 Drawing Sheets

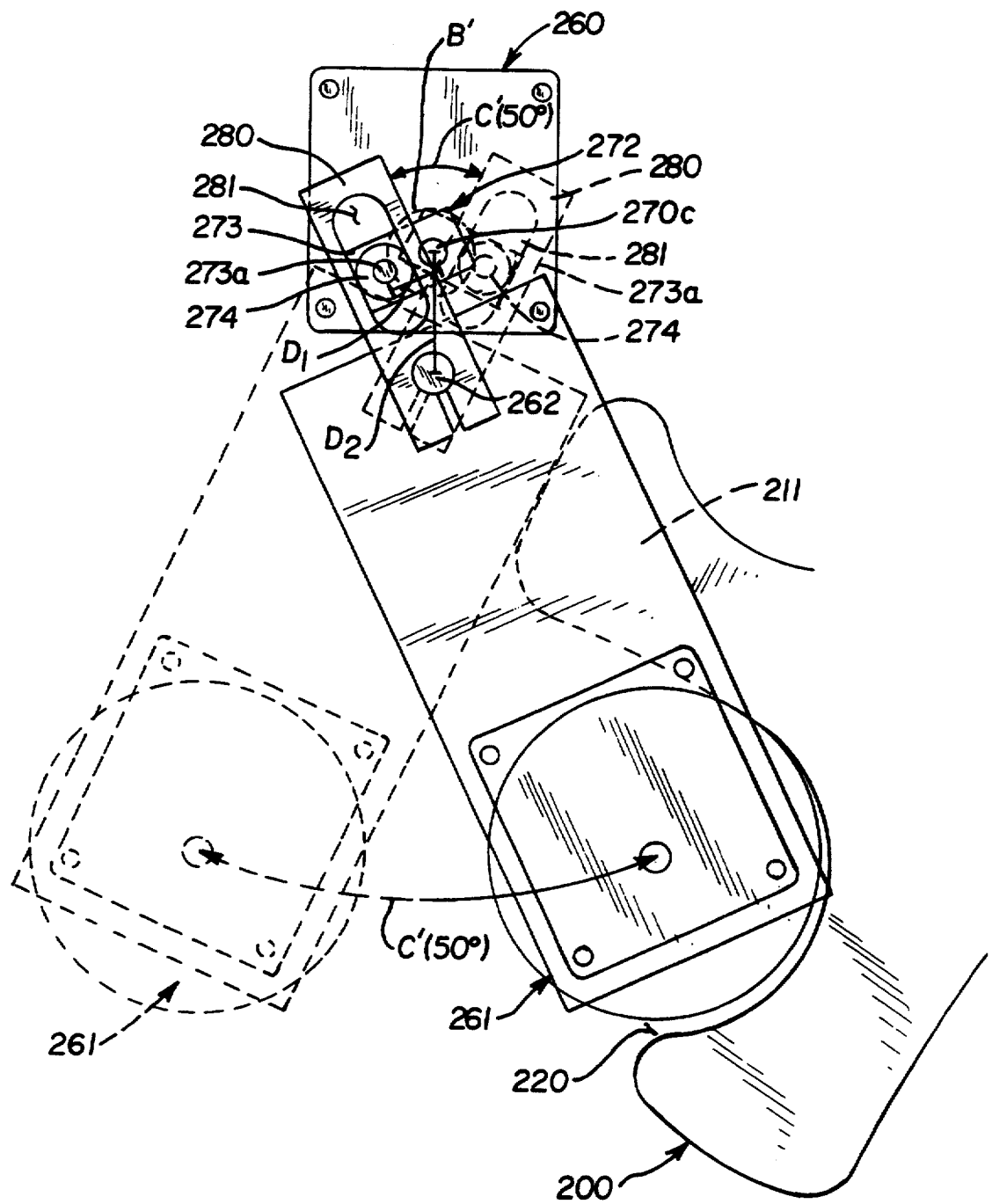
FIG_8

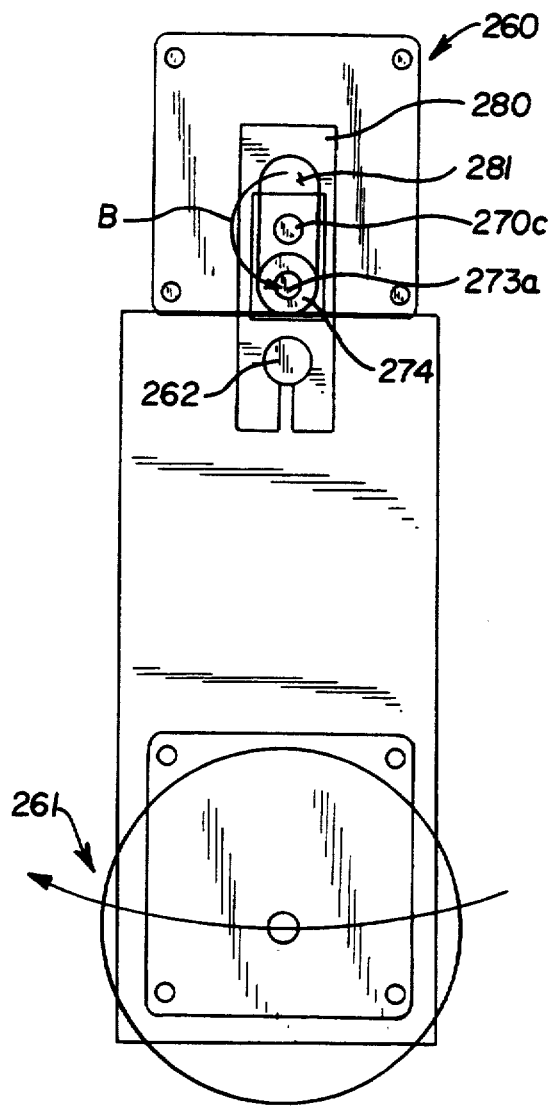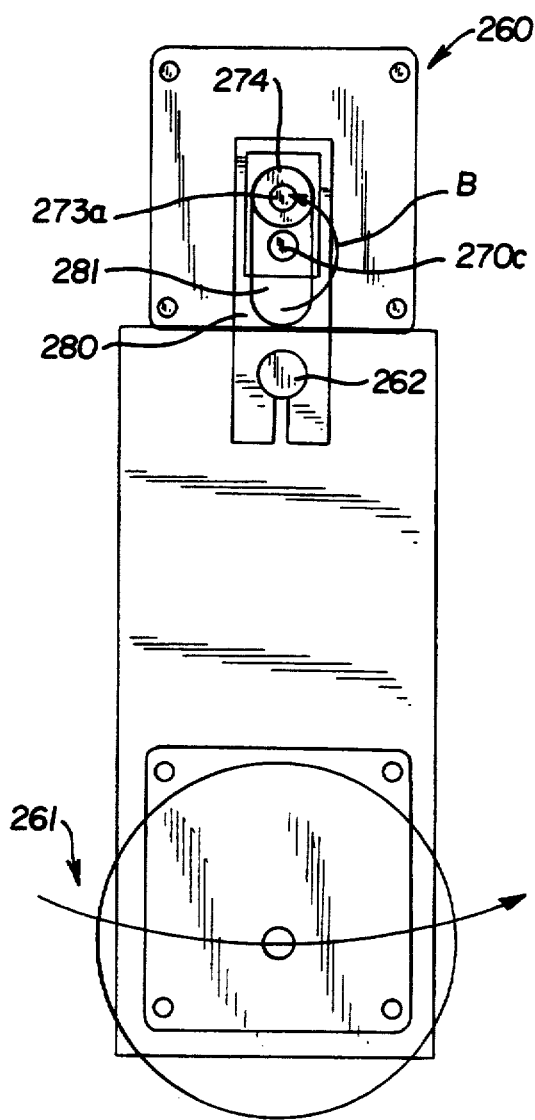
FIG_8A  FIG_8B

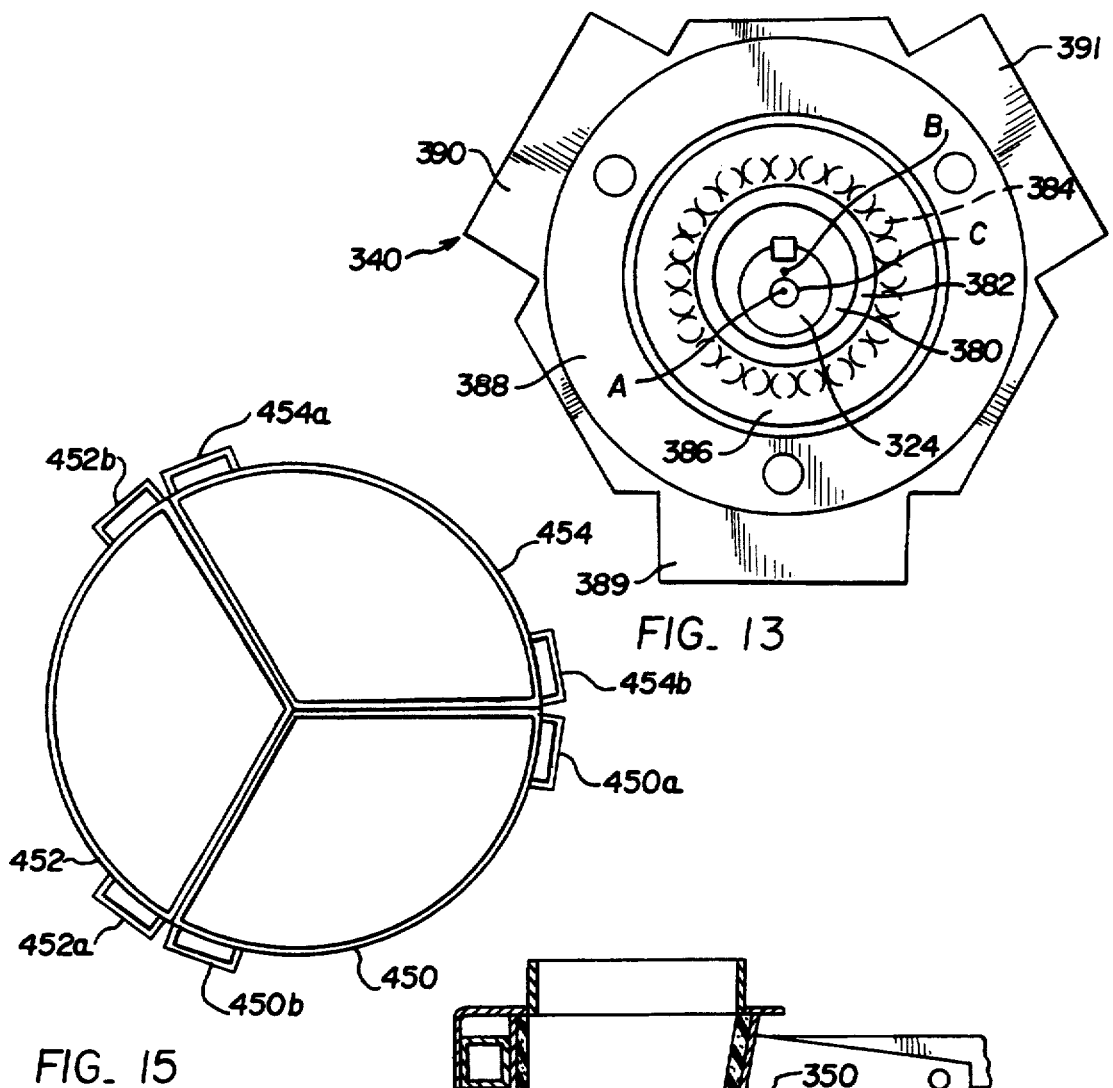
FIG. 13
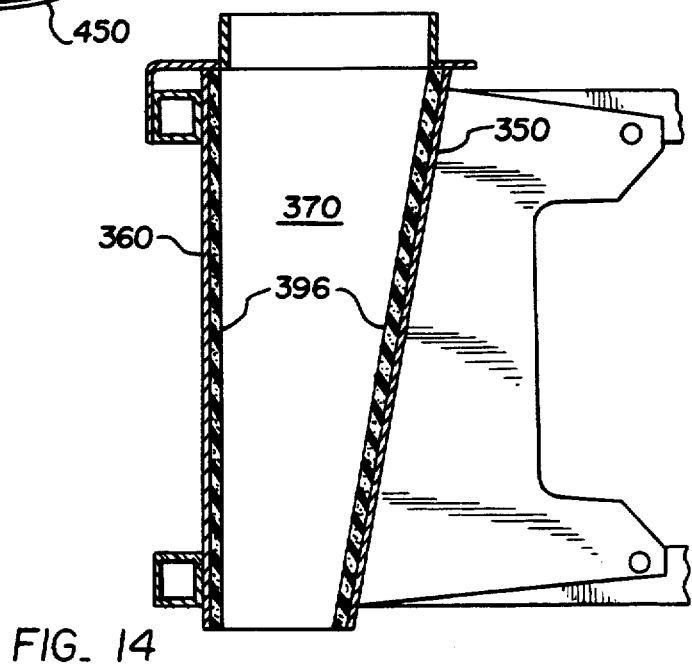
FIG. 15
FIG. 14

APPARATUS FOR RECYCLING GLASS CONTAINERS

This is a division of application Ser. No. 07/741,939, filed Aug. 8, 1991.

BACKGROUND OF THE INVENTION

1. Field of the Invention

This invention relates to an apparatus for recycling glass containers and more specifically, to an apparatus which accepts, separates and either deposits a glass container in a bin or crushes the glass container into pieces which are in turn deposited in a bin. The apparatus also includes means for compensating a customer for the deposit of glass containers into the apparatus.

2. Background Information

The handling of returned containers, such as glass containers, for purposes of recycling or the like, has become a major concern. Glass containers can be recycled either by returning empty containers for refilling or by crushing empty containers to produce glass cullet. Recycling of glass containers not only reduces the raw material costs for making new glass bottles, but also reduces the amount of garbage which is deposited into garbage dumps and as litter. Because of these benefits, many states have mandated recycling or that a deposit be placed on glass beverage containers, thus giving consumers the incentive to return their empty glass beverage containers to retail establishments in order to receive a refund.

However, collecting the returned glass beverage containers can be burdensome for retail outlets such as grocery stores or recycling centers. Many grocery stores must devote an inordinately disproportionate amount of their available floor space and personnel to the collection, storage and sorting of returned containers. For consumers, it is often too inconvenient for them to recycle glass containers thus leading them to merely discard glass bottles instead of recycling. These situations combine to discourage the economically and socially beneficial process of recycling.

It is known to provide automated recycling machines which accept containers and which refund money or a coupon to consumers for their returned containers. U.S. Pat. No. 4,258,426 discloses a container redemption apparatus having a carousel upon which a container may be placed. The carousel rotates to expose the uniform product code (hereinafter "UPC") on the container to a scanner which reads the UPC. If the container is acceptable, an accept arm sweeps the container from its position in the carousel through a quadrant opening in the base plate of the carousel for subsequent shredding in a shredder. Unacceptable containers keep rotating and are swept off the carousel by a reject arm. A return control accounting system which keeps track of the number of containers deposited is also disclosed.

In recycling glass containers, it is especially desirable to separate the colored glass containers from the non-colored glass containers prior to crushing. It is further desirable to separate the colored glass into brown and green glass. For machines which do not separate on the basis of the color of the glass, the crushed glass must either be used as an aggregate in road construction materials ("glassphalt") or discarded as scrap. At current market prices, one ton of pure clear glass is worth $35/ton whereas one ton of pure brown glass is $21/ton and one ton of pure green glass is $18/ton. Compare this to the fact that a mixture of any two or three of the above types of glass must be scrapped and taken to a landfill dump, and the economic incentive to separate glass containers by color is obvious.

U.S. Pat. No. 4,573,641 discloses a glass bottle collection and crushing apparatus consisting of an optical UPC scanner that accepts or rejects bottles for the machine, means for separating the acceptable bottles into clear glass bottles and colored glass bottles, means for crushing the clear and colored glass, and storage means for storing the glass cullet received from the respective crushing means. The crushing means include a drive mechanism which rotates a cross bar and extending bar of the crushing wheel. A coin dispensing device is also provided. This machine, however, does not provide for further separation of the colored glass into pure brown and pure green glass.

A major component of a glass recycling apparatus that crushes glass into glass cullet is the crusher apparatus. The crusher must be compact and operate quietly yet must also effectively crush the glass. Complicating the crushing of the glass container is that most glass containers have paper labels which tend to jam the crusher and prevent complete crushing of the glass containers. In addition, as was explained hereinbefore, it is desirable to separate and crush clear, green and brown glass containers. This requires three separate crushers. Because of space, weight and power considerations, it is desirable to have a compact and efficient crushing unit mounted inside the recycling apparatus.

Finally, there are many glass containers which are "returnable". Returnable glass containers are those that are returned by the customer after use and which are washed and refilled. Heightened environmental awareness will only lead to more use of these so-called "returnable" containers. At present, there is no recycling apparatus that will accept and process returnable glass containers.

Therefore, despite the above machines and apparatus, there remains a need for an apparatus for recycling glass containers that is easy to use by consumers and which provides enough economic incentive for the retailer to buy and maintain. There also remains a need for compact and efficient glass crushers that can be used with these recycling apparatuses. Finally, there remains a need for a recycling apparatus that will accept and process returnable glass containers.

SUMMARY OF THE INVENTION

The apparatus for recycling glass containers of the invention has met the hereinbefore stated needs. The apparatus comprises an enclosure having at least one customer access opening and a rotatable carousel mounted in the enclosure. The rotatable carousel defines a plurality of glass container receiving recesses for sequentially receiving glass containers through the customer access opening. A fixed platform defining at least two openings underlies the carousel and a scanning means, mounted in the enclosure, is positioned adjacent the carousel for scanning the code markings on the glass container. At least one trap door is provided, the trap door being operatively associated with one of the openings in the fixed platform. The scanning means electrically controls the movement of the trap door so that glass containers, upon rotation of the carousel, will selectively fall through one of the openings in the fixed platform. A storage bin is provided which underlies one of the openings for receiving glass containers falling therethrough.

A glass container engaging device is also disclosed which comprises a frame, a motor having a shaft and linkage connected to the shaft. A movable jaw is connected to the linkage means and a stationary jaw is mounted to the frame, the movable jaw and the stationary jaw defining a converging glass container receiving throat. The linkage converts the rotary motion of the shaft into a path of movement of the movable jaw which has both translational and rotational components.

Another glass container engaging apparatus is disclosed which is comprised of a frame, a motor having at least one rotary shaft and a bushing which converts the rotary motion of the shaft to eccentric motion. Three separate movable jaws are connected to the eccentric bushing and three associated stationary jaws are mounted to the frame. Each pair of movable jaw and stationary jaw defines separate glass container receiving throats.

It is an object of the invention to provide a glass recycling apparatus that automatically separates glass containers by color of glass for further processing.

It is a further object of the invention to provide a glass recycling apparatus that eliminates the need for manual sorting and handling of returned glass containers.

It is a further object of the invention to provide a glass recycling apparatus that deposits the separated glass containers in separate storage bins so that different colored glass containers are not mixed.

It is a further object of the invention to provide a glass container engaging apparatus that efficiently and effectively crushes glass containers.

It is a further object of the invention to provide a glass container engaging apparatus having means for retarding the dropping speed of a glass container placed therein.

It is a further object of the invention to provide a glass container engaging apparatus that has three separate glass container receiving throats operated by a single drive means.

It is a further object of the invention to provide a glass container engaging apparatus in the recycling apparatus that can accept and separately process three different colored glass containers.

It is a further object of the invention to provide separate storage bins underlying each crusher in the recycling apparatus so that glass containers of the same color that are processed by the glass container engaging apparatus can be deposited into each of the storage bins.

These and other objects of the invention will be more fully understood from the following description of the invention with reference to the drawings appended to this application.

BRIEF DESCRIPTION OF THE DRAWINGS

FIG. 8 is a detailed top plan view of the first trap door means showing the operation thereof.

FIG. 8A is a further detailed view showing the operation of the first trap door means.

FIG. 8B is still a further detailed view showing the operation of the first trap door means.

FIG. 13 is a top plan view, partially in section, of the converting means of the glass container apparatus.

FIG. 14 is a cross-sectional view similar to FIG. 11 only showing the resilient pad means mounted on the movable and stationary jaws.

FIG. 15 is a top plan view of the storage bins which underlie the glass container engaging apparatus.

DESCRIPTION OF THE PREFERRED EMBODIMENTS

Figure 1:
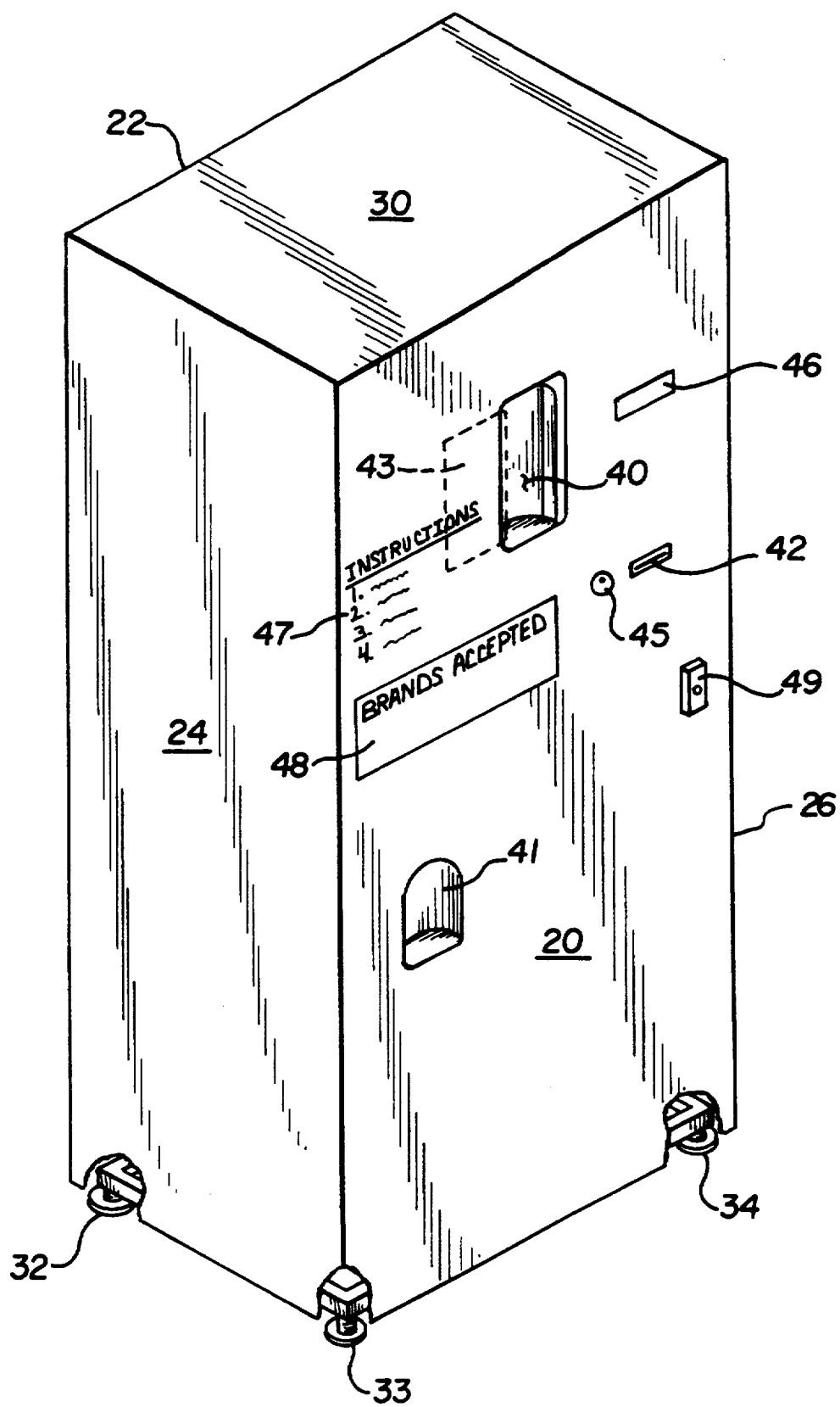
FIG. 1 is a perspective view, with some sections partially cutaway, of the glass recycling apparatus of the invention.

Referring now to FIG. 1, the glass container recycling apparatus of the invention is shown. The apparatus is in the form of a box-like enclosure, having a front wall 20, back wall 22, two sidewalls 24, 26 and a top wall 30. The enclosure includes four leveling feet, of which three are shown as indicated by the reference numerals 32, 33 and 34. The feet lift the apparatus off of the floor and also permit leveling of the enclosure. The enclosure walls are preferably made of steel, but other materials such as aluminum can be used. The approximate measurements of the apparatus is about six feet in height, three feet in width and three feet in depth.

The front wall 20 defines three customer access openings 40, 41 and 42. Customer access opening 40 provides a means for a customer to place into the apparatus the glass containers to be processed by the apparatus. Once a customer places a glass container into customer access opening 40, safety door means 43 (shown in phantom in FIG. 1) will be slid to the right thus blocking the customer access opening 40. Safety door means 43 will be explained in detail with reference to FIG. 3. Customer access opening 41 is the means by which glass containers that are placed into the apparatus but which are rejected by the apparatus are returned to the customer. Finally, customer access opening 42 is the means by which a receipt indicating the number and type of glass containers processed by the apparatus is outputted to the customer. The receipt is printed and outputted to the customer by pushing button 45.

The front wall 20 also contains an electronic message board 46. The message board 46 can display a message such as "WELCOME" or will also display the word "FULL" when the apparatus is no longer able to accept more glass containers. The front wall 20 can also include indicia 47 listing instructions for use of the machine and separate indicia 48 showing which types of glass containers (i.e. brand names such as 7-Up, Coca-Cola and Pepsi) which will be accepted by the apparatus. Finally, a locking means 49 is provided on the front wall 20 of the enclosure so that access to the inside of the apparatus can be achieved.

It will be appreciated that to the customer, the apparatus is operated as follows. The customer places a glass container into the apparatus through customer access opening 40. Once the customer places the container through customer access opening 40 and removes his hand, the safety door 43 will close automatically. As will be explained in detail hereinafter, the apparatus will process the glass container. If the glass container is unacceptable it will be returned to the customer through customer access opening 41. If the glass container is acceptable, it will be processed by the apparatus. Once the first glass container is processed, the customer can repeat the process for all remaining glass containers. The process is repeated until all of the customer's glass containers are processed or rejected. At that point, the customer presses button 45 to output a receipt (not shown) which will show how many and what type of glass containers were processed. The customer merely takes this receipt to the store personnel in order to get a cash (or other type of consideration) refund.

Figure 2:
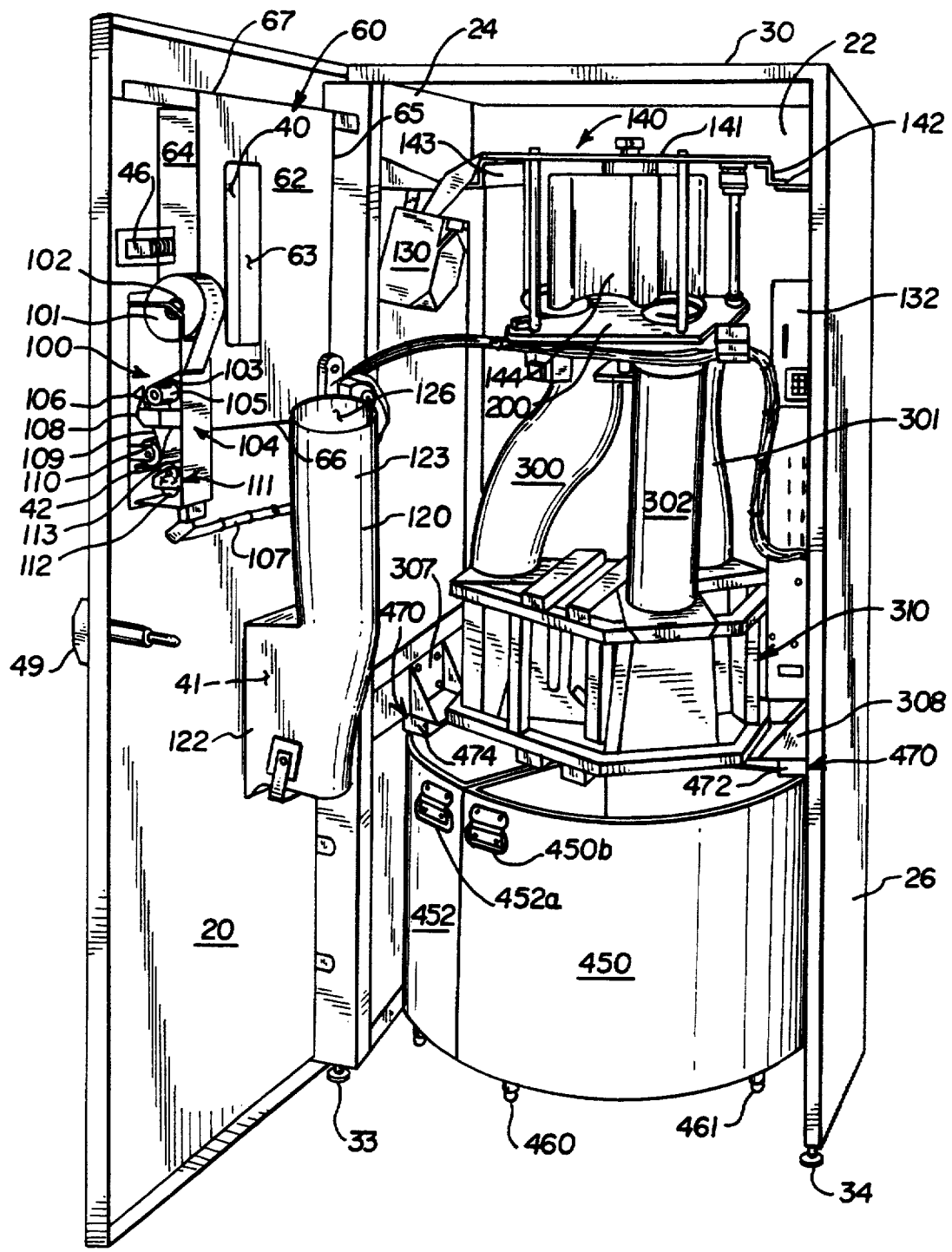
FIG. 2 is a perspective view similar to FIG. 1 only showing the front wall of the enclosure pivoted away from the rest of the enclosure so that the inside of the apparatus may be seen.

Referring now to FIG. 2, the enclosure is shown with the front wall 20 opened to show the inside of the apparatus. As will be appreciated, the front wall 20 is hingedly connected to sidewall 24 in order to enable access to the inside of the apparatus. Mounted on the inside of front wall 20 is an enclosure 60 for the safety door means 43. The enclosure 60 has a back wall 62 which defines an opening 63 which cooperates with customer access opening 40. The enclosure 60 further consists of two sidewalls 64 and 65, a bottom wall 66 and a top wall 67 which define a space within which the safety door means 43 is enclosed.

Figure 3:
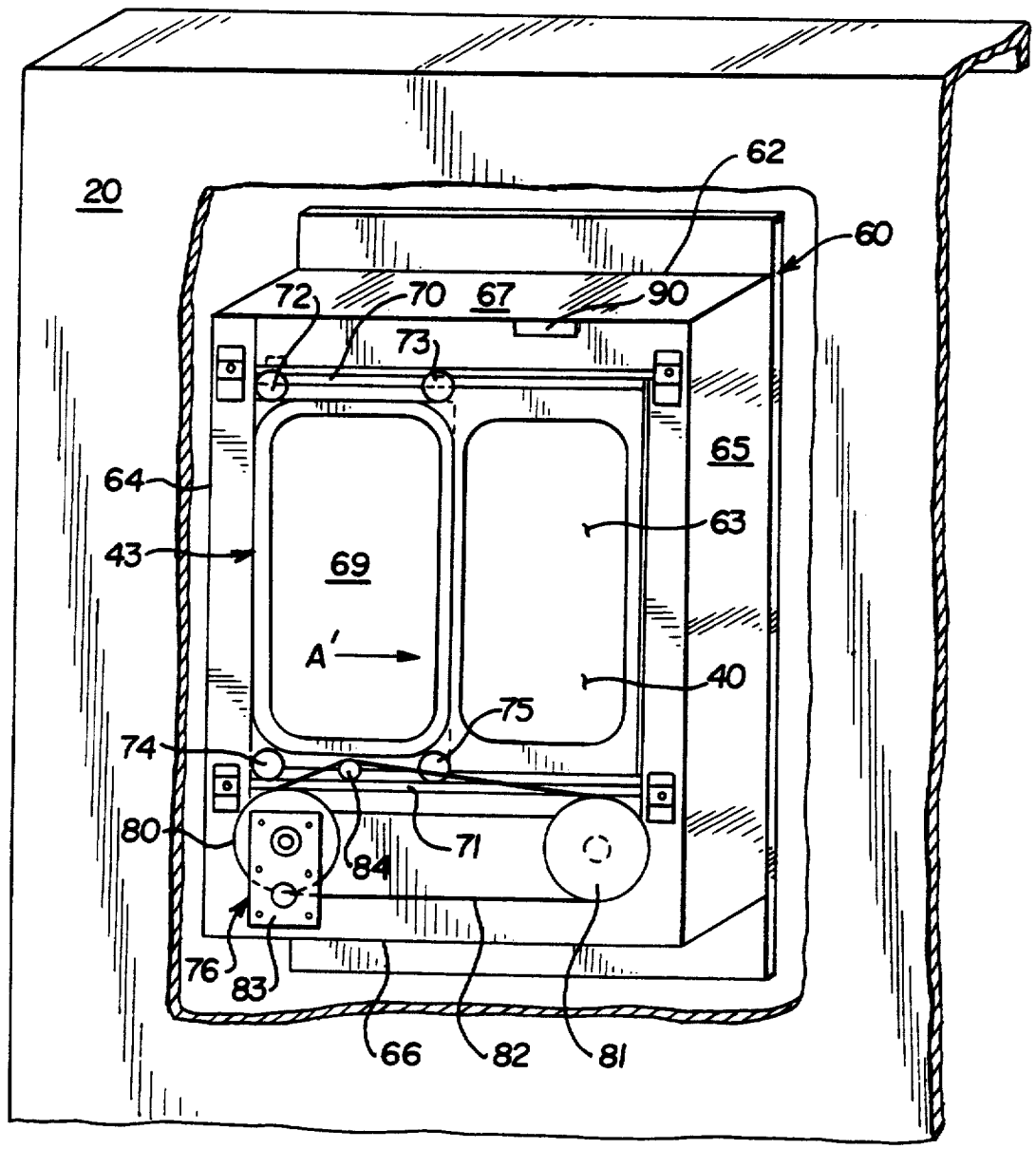
FIG. 3 is a detailed perspective view of the safety door means of the invention.

A detailed view of the safety door means 43 is shown in FIG. 3. The safety door means 43 consists of a sliding door 69 which is slidably mounted to an upper track 70 and a lower track 71 by respective wheels 72, 73 and 74, 75. A drive and pulley means 76 consisting of (i) two pulleys 80 and 81 connected by an endless belt 82 and (ii) a reversible motor 83 are provided. The belt 82 is connected to the lower portion of the sliding door 69 by rivet 84. It will be appreciated that the movement of the belt 82 by means of drive and pulley means 76 will cause movement of the sliding door 69.

A hand sensor 90 is mounted above the customer access opening 40. In operation, the sliding door 69 is normally in the position shown in FIG. 3 (furthest to the left looking at FIG. 3). Once a customer places a glass container through the customer access opening 40 for placement into the apparatus and then removes his hand, the sensor 90 sends an electronic signal to the controller assembly 132 (described hereinafter) which in turn energizes motor 83 to operate the drive and pulley means 76 to move the safety door 70 in the direction of arrow A' so that the customer access opening 40 is blocked.

Referring back to FIG. 2, the receipt printing means 100 is shown mounted to the inside wall of the front wall 20. The receipt printing means 100 outputs the receipt to the customer which indicates the number and type of glass containers that the apparatus has processed. This receipt is used by the customer in order to get a cash (or other consideration) refund.

The receipt printing means 100 consists of a thermal paper roll 101 mounted on a support shaft 102, the paper 103 from the thermal paper roll 101 being fed into the receipt printing enclosure means 104. The paper 103 is fed into the receipt printing enclosure means 104 by means of a first driven roller 105. The paper 103 is then disposed between the first roller 105 and printing mechanism 106. The printing mechanism 106 prints customer information concerning the processing of glass containers by the apparatus. It is controlled by electronic signals received from the controller assembly 132 (discussed below) through wires 107.

After printing, the paper 103 on which the customer information is printed is cut by paper cutter 108 to form a customer receipt 109. Thus, the receipt 109 is cut before it is outputted to the customer. The customer receipt 109 is outputted through receipt opening 42 by means of a second roller 110 and a receipt output means 111 consisting of a motor 112 which drives a third roller 113. It will be appreciated that the customer receipt 109 is disposed between the second roller 110 and the third roller 113 and is outputted to the customer by the frictional engagement of the receipt against the rollers 110 and 113.

Also mounted to the inside wall of front wall 20 is electronic message means 46. Electronic message means 46 is electrically connected to the controller assembly. A suitable electronic message means 46 is Model No. LM4128BGICI6SN made by Allied Electronics of Worthington, Ohio.

Mounted on the inside of the front wall 20 is a reject chute 120. The reject chute 120 has a lower portion 122 which is connected to the customer access opening 41 in the front wall 20 and an upper portion 123 which defines a circular opening 126. As will be explained hereinafter, unacceptable glass containers which are placed in the apparatus will be returned to the customer through reject chute 120 and customer access opening 41.

Referring still to FIG. 2, a laser scanner 130 is mounted on wall 24 of the enclosure. The laser scanner 130 reads the UPC of the glass container placed in the apparatus. The laser scanner 130 can also identify the shape of the glass container. A suitable laser scanner is Model No. OS-510 made by Micro Video, Inc. of Campbell, Pa. The laser scanner 130 is positioned at an axial height which will cause it to be aligned with the UPC on the glass container when the glass container is axially rotated (as will be explained hereinafter) to the appropriate position.

As is known, the laser scanner 130 reads the UPC of the glass container and outputs an electronic signal based on the UPC. This electronic signal is transmitted to the controller assembly 132. The controller assembly 132 includes a microprocessor having a programmable memory. A suitable controller assembly 132 is Model No. 10-1200 made by MetroMining Group 3 of Richmond, Ind. The programmable memory includes data relating to characteristics of various glass containers based on the UPC, including the color of the glass containers, the return cash value of the glass containers and the crushed volume of the glass containers. The controller assembly 132 has means for generating a reject signal and a color indication signal based on the UPC read by the laser scanner 130. The controller assembly 132 also has means for generating a signal when no code markings are present on the glass container. This signal is used to control the movement of the carousel and the trap door means, which will be explained hereinafter with respect to FIGS. 2 and 4–8. In addition, the controller assembly 132 stores information concerning the number and type of glass containers that are fed into the apparatus. The controller assembly 132 controls the receipt printing means 100 and also provides to store personnel an accounting of all of the transactions made by the apparatus.

Referring again to FIG. 2, the carousel means 140 of the invention is mounted in the enclosure by means of a horizontal carousel mounting plate 141 (see also FIG. 4) which in turn is attached to carousel plate mounting brackets 142 and 143. Brackets 142 and 143 are attached to sidewalls 26 and 24 of the enclosure, respectively. The carousel 140, therefore, hangs down from carousel mounting plate 141, as is shown in FIGS. 2 and 4.

Figure 4:
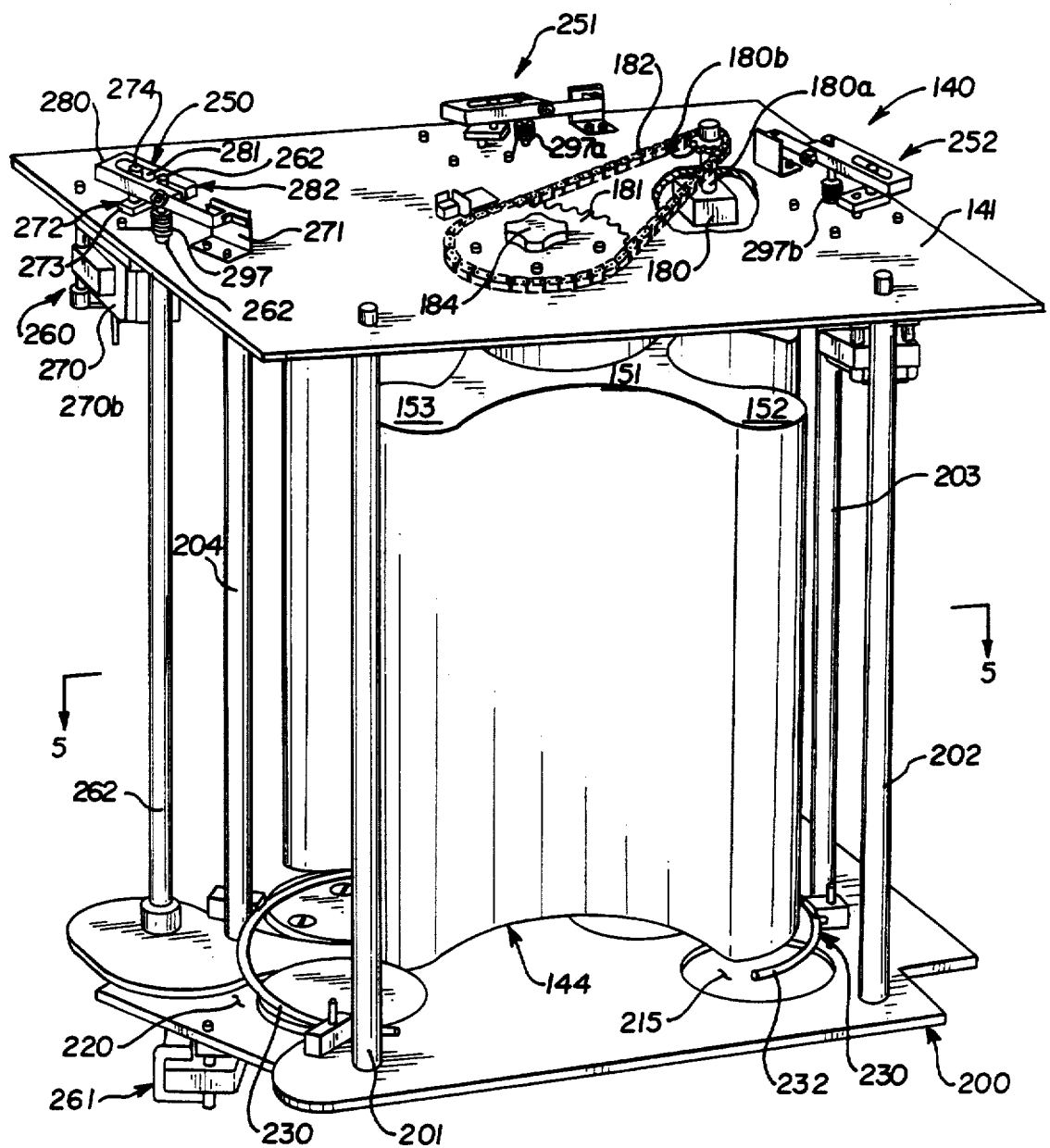
FIG. 4 is a detailed perspective view of the carousel means removed from the apparatus.
Figure 5:
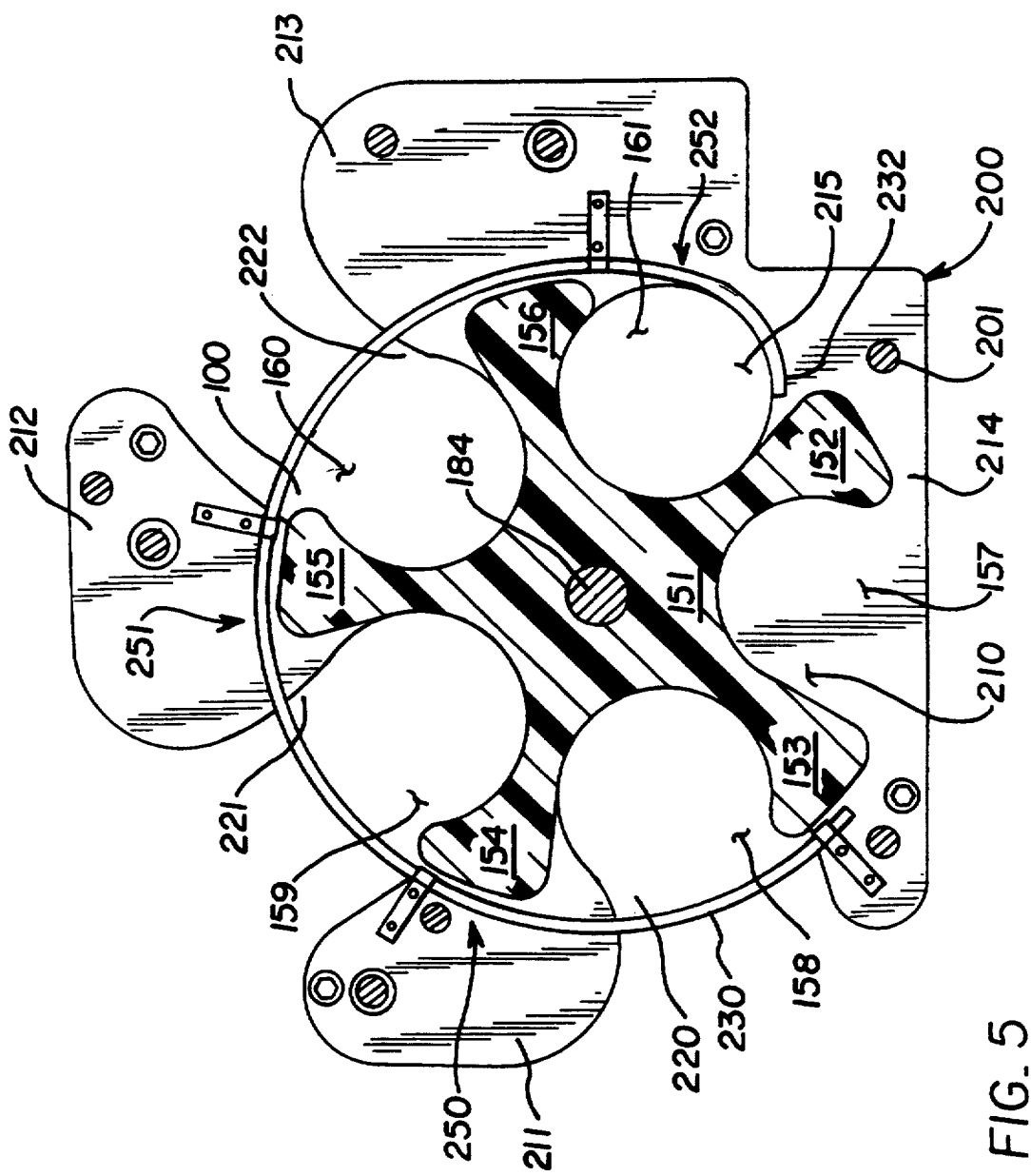
FIG. 5 is a cross-sectional view taken along line 5—5 of FIG. 4 but, for clarity, not showing the trap door means.

Referring now more particularly to FIGS. 4–8, the carousel means 140, fixed platform 200 and trap door means 250, 251 and 252 of the invention will be described. The carousel means 140 consists of a carousel 144 which is preferably made of plastic which has a central hub 151 and five radially extending walls 152, 153, 154, 155 and 156 which define five separate glass container receiving recesses 157, 158, 159, 160 and 161 (FIG. 5). It will be appreciated that a glass container is placed through the customer access opening 40 and into one of the glass container receiving recesses for further processing by the apparatus.

Figure 7:
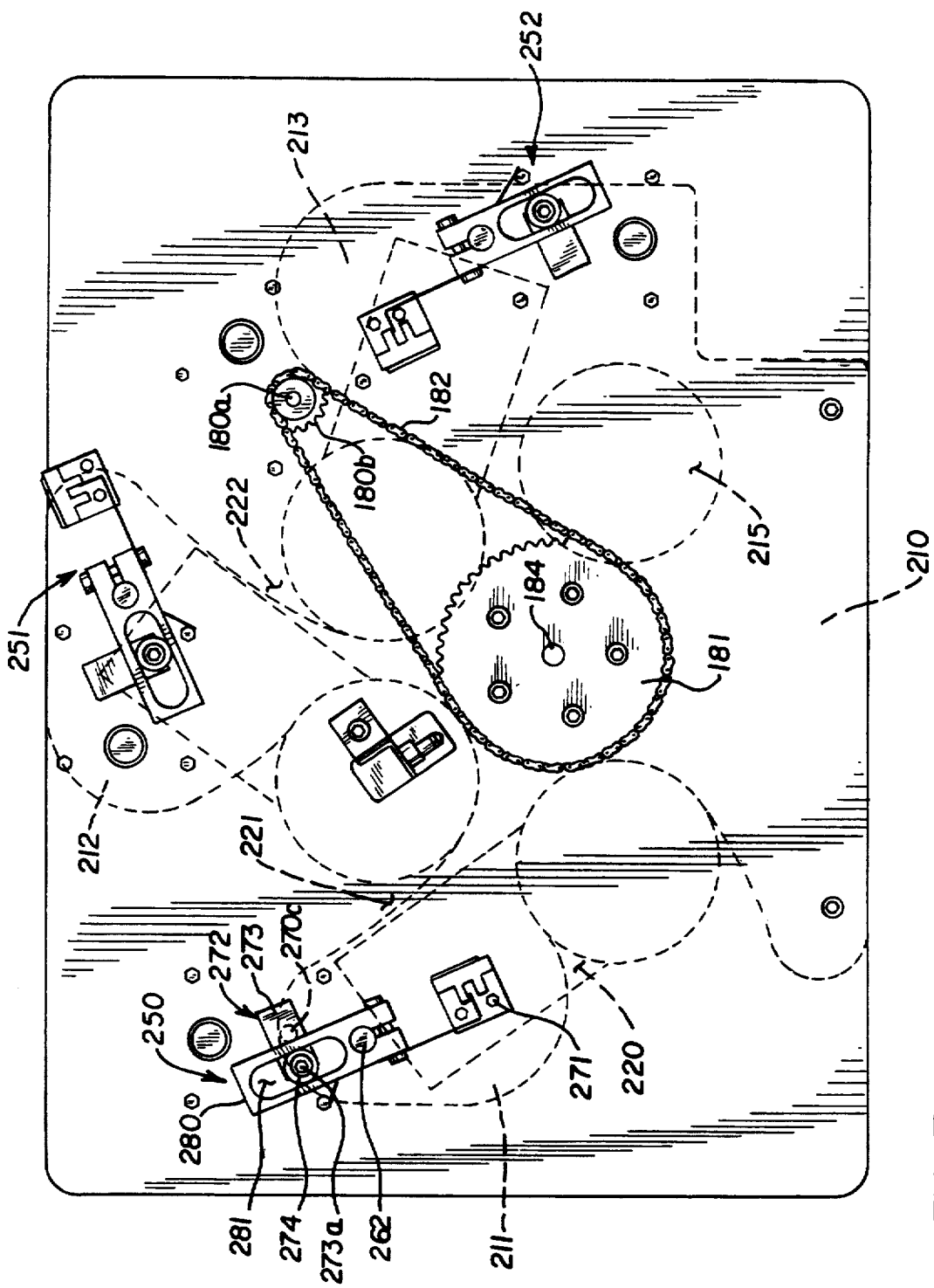
FIG. 7 is a top plan view of the carousel showing, in phantom, the three trap door means in operative association with the fixed platform.
Figure 9:
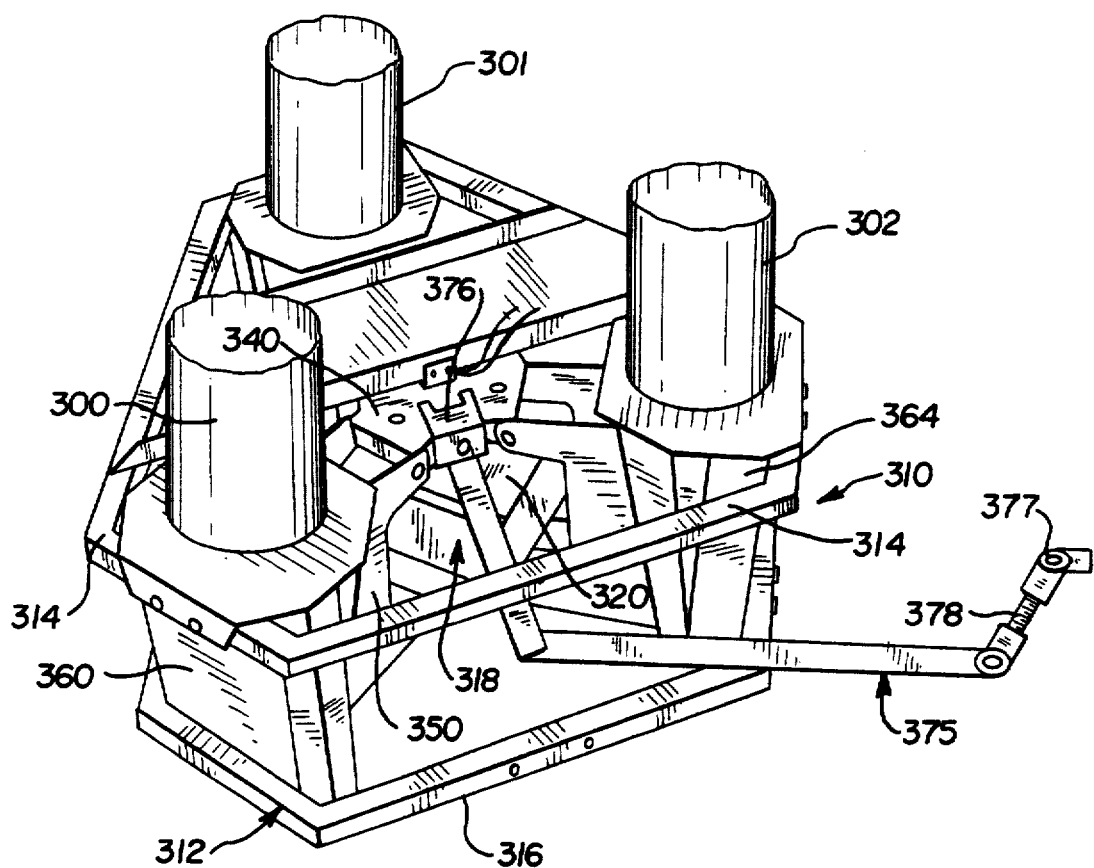
FIG. 9 is a perspective view of the chutes and one embodiment of the glass container engaging apparatus of the invention.
Figure 10:
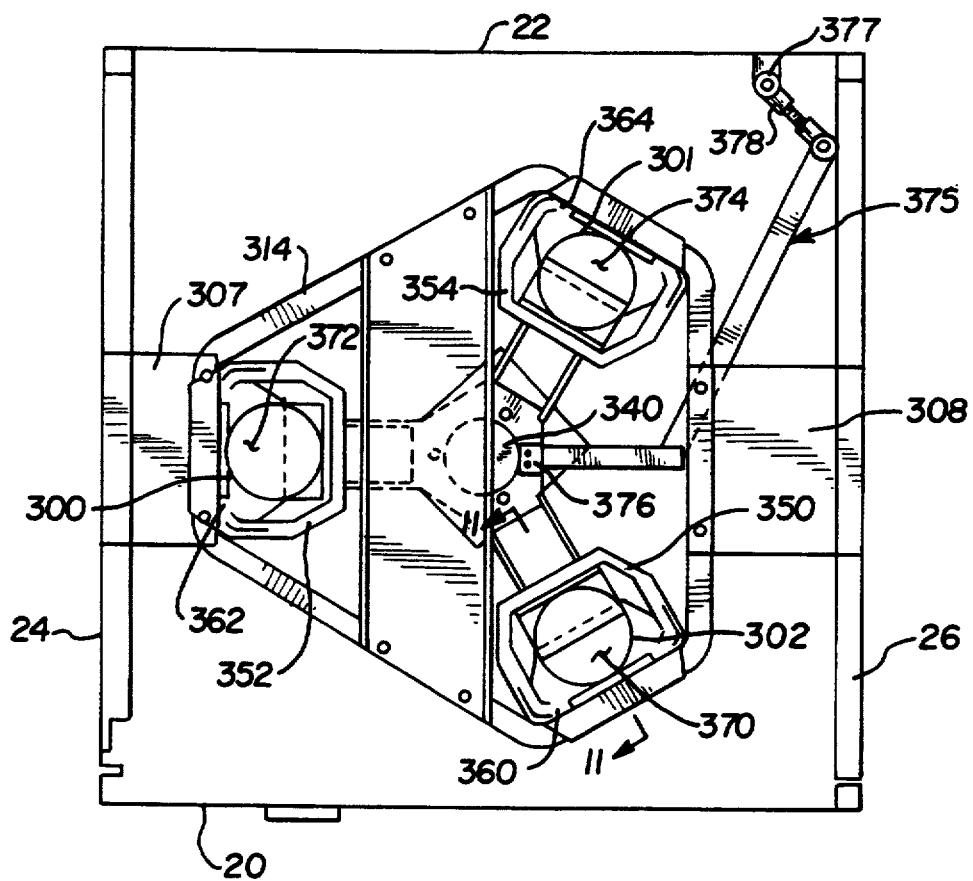
FIG. 10 is a top plan view of the glass container engaging apparatus and chutes as it is mounted in the enclosure.

As can best be seen in FIGS. 4, 5 and 7, the carousel 144 is rotated about its central axis which passes through shaft 184 embedded in central hub 151 by means of a carousel rotation means including (i) motor 180 underneath and secured to the mounting plate 141 with the motor shaft 180a protruding above the carousel plate 141; (ii) a first sprocket 180b fixedly secured to the shaft 180a for rotation therewith; (iii) second sprocket 181; and (iv) chain 182. The chain 182 engages first sprocket 180b and second sprocket 181. Second sprocket 181 is fixedly secured to shaft 184 which extends into and is physically secured to the central hub 151 of the carousel 140 (FIG. 5). The motor 180 is controlled by controller assembly 132. A suitable motor is Model No. 3M385 made by Dayton Electric Manufacturing of Chicago, Ill.

Referring now to FIG. 4, underlying, spaced from and parallel to the carousel 144 is a fixed platform 200. Fixed platform 200 is supported by vertical support rods 201, 202, 203 and 204 each having a bottom end attached to the fixed platform 200 and a top end attached to the carousel mounting plate 141. As can best be seen in FIG. 5, the fixed platform 200 has an irregular shape having a central area 210 and three lobes 211, 212 and 213. The fixed platform 200 also defines a circular hole 215. Central area 210 and lobe 211 define a first recess 220; lobes 211 and 212 define a second recess 221; and lobes 212 and 213 define a third recess 222. Mounted on the bottom of platform 200 is a glass container retaining rail 230 (FIGS. 4 and 5). The rail 230 facilitates guidance of a glass container as it is moved in an orbital path by the carousel 144. The rail 230 has a curled section 232 which facilitates insuring that a glass container will be deposited in hole 215, if it reaches that far in the orbital path.

Referring now to FIGS. 4 and 6–8, three trap door means 250, 251 and 252 are in operative association with the fixed platform 200. First trap door means 250 has a lower trap door that is in operative association with first recess 220; second trap door means 251 has a lower trap door that is in operative association with second recess 221; and third trap door means 252 has a lower trap door that is in operative association with third recess 222.

Figure 6:
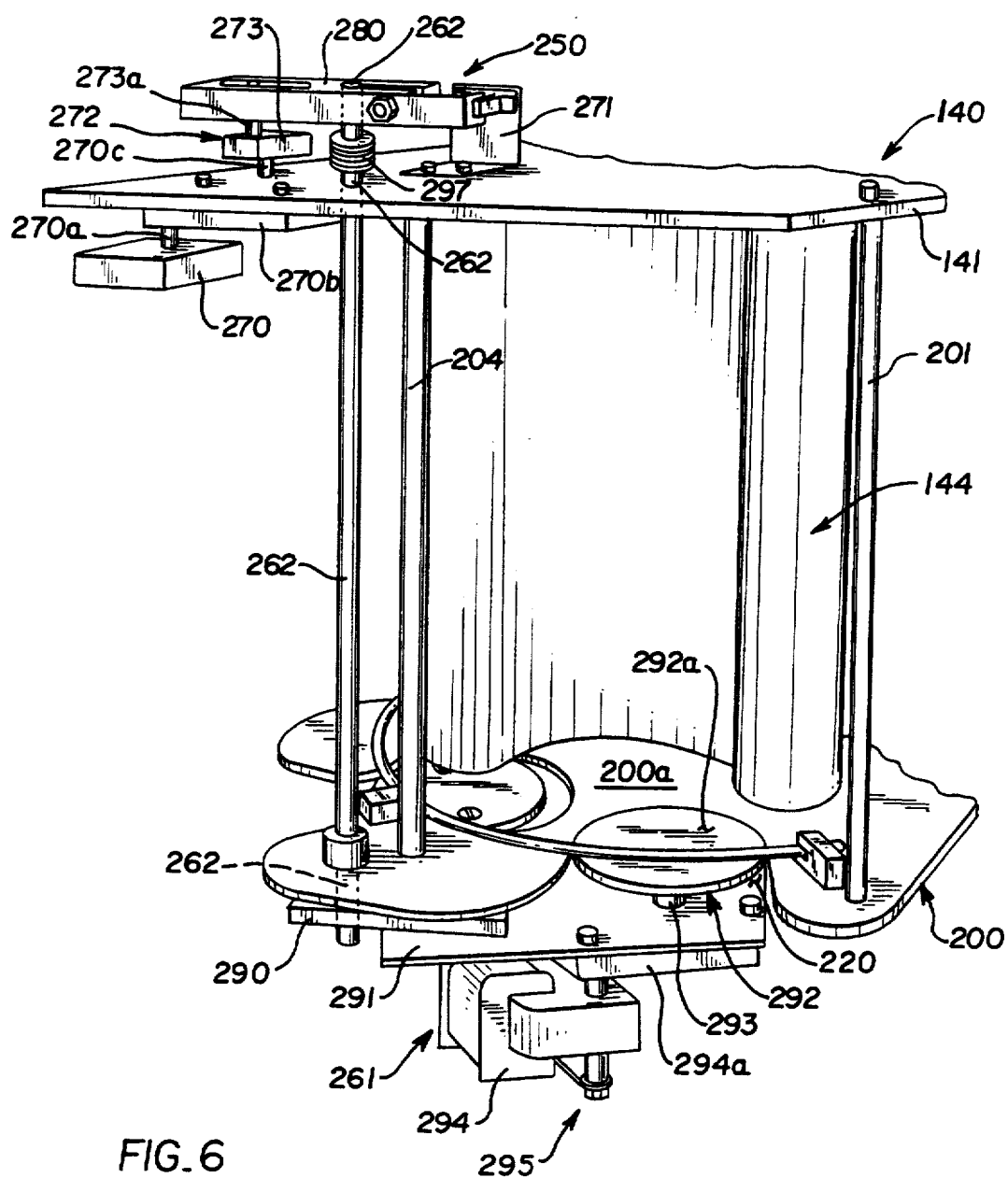
FIG. 6 is a perspective view of the first trap door means with associated turntable.

Referring particularly to FIGS. 4 and 6, the first trap door means 250 consists of the drive means 260 which is mounted above and disposed underneath the carousel mounting plate 141; trap door 261 which is in operative association with recess 220; and a generally vertical elongated rotatable shaft 262 which connects the drive means 260 to the trap door 261.

The drive means consists of a 115 volt, 1750 rpm motor 270 having a motor shaft 270a (FIG. 6). A suitable motor 270 is made by Dayton Electric Co. of Chicago, Ill., Model No. 3M385. Power to the motor 270 is provided by means of terminal connection 271 to which wires (not shown) are connected. These wires are connected to the controller assembly 132 which, as stated hereinbefore, controls the movement of the trap door means 250. The motor shaft 270a extends from the motor 270 into a gearbox 270b which is mounted to the underside of carousel plate 141, as shown in FIG. 6. The gearbox 270b has an output shaft 270c which extends through the carousel plate 141 and protrudes upwardly therefrom (FIG. 6). The output shaft 270c rotates at 50 rpm, thus, the gearbox 270b effects a 35 to 1 reduction from the motor shaft 270a rpm of 1750.

Top portion of the output shaft 270c is connected to cam means 272 consisting of cam arm 273 having a shaft 273a on which a cam roller 274 which is rotatably mounted (FIG. 7). It will be appreciated that the output shaft 270c will responsively rotate the cam arm 273 such that the cam roller 274 will rotate in the path B' shown in FIG. 8.

The cam roller 274 is disposed within a longitudinal slot 281 defined by a rectangular member 282 (FIG. 7). Fixedly connected to one end of the second rectangular member is the shaft 262. It will be appreciated that counterclockwise rotation of the cam means 272 will cause reciprocating movement of the cam roller 274 within the slot 281 to cause responsive oscillating movement of the rectangular member 280 as shown in FIG. 8.

Referring more particularly to FIGS. 8, 8A and 8B, the operation of trap door means 250 will be discussed. The trap door 261 preferably moves through an angle of 50° from a closed position when trap door 261 is engaged into recess 220 (solid lines in FIG. 8) to an open position when trap door 261 is moved away from recess 220 (phantom lines in FIG. 8). This angle of rotation allows the trap door 261 to effectively clear from the recess 220 so that the glass container has sufficient space and time to fall through the recess 220 without tipping or hitting the trap door 261 or fixed platform 200. The angle of 50° is determined by two factors (i) the distance $D_1$ from the center of gearbox shaft 270c to the center of cam roller 274 and (ii) the distance $D_2$ from the center of gearbox shaft 270c to the center of rotatable shaft 262.

Based on the distances $D_1$ and $D_2$ which determine the angle of the 50° rotation, the cam roller 274 will rotate through an arc of 130° of circle B in order to move the trap door 261 clockwise from the closed position through an arc of 50° to the open position shown in FIG. 8. In order to move the trap door 261 counterclockwise from the open position to the closed position, it follows that the cam roller 274 will rotate through an arc of 230° of circle B, thus completing one 360° rotation of the cam roller 274 to return to its original position.

It will be appreciated that the trap door 261 rotational arc can be changed from 50° to any value between 0° and 180°. In order to change the trap door 261 rotational arc, the distances $D_1$ and $D_2$ must be changed. It follows then that the arc through which cam roller 274 will rotate in order to open and close the trap door will also change. For example, in order to obtain a trap door rotational arc of 30°, one or both of the distances $D_1$ and $D_2$ would have to be decreased. This would also mean that the arc through which cam roller 274 will rotate to move trap door 261 from a closed to an open position will increase above 130° (to about 150°) and the arc through which cam roller 274 will rotate to move trap door 261 from an open to a closed position will decrease below 230° (to about 210°). Conversely, in order to obtain an arc of 60°, one or both of the distances $D_1$ and $D_2$ would have to be increased. This would mean that the arc through which cam roller 274 will rotate to move trap door 261 from a closed to an open position will decrease below 130° (to about 120°) and the arc through which cam roller 274 will rotate to move trap door 261 from an open to a closed position will increase above 230° (to about 240°).

As the cam means 272 and thus cam roller 274 rotates at a constant speed, the lesser the arc of rotation that the cam roller 274 travels around circle B', the faster the trap door 261 will move from the closed to the open position. Conversely, the greater the arc of rotation, the slower the trap door 261 will move from the open to the closed position. Thus, as the 50° rotation from the closed to open position means that the arc of rotation of the cam roller 274 is 130° from a closed to an open position and 230° from an open to a closed position, it follows that the trap door 261 will go from a closed to an open position faster than from an open to a closed position. This movement is desired because when the trap door 261 is moved out from under the glass container, it is desired to move the trap door 261 out from under the glass container quickly so that the glass container will fall through the recess 220 in the most stable manner without tipping over or contacting the trap door 261 or fixed platform 200 during the fall. On the other hand the counterclockwise movement of the trap door 261 from an open to a closed position is desired to be slow so that the glass container has time to clear the trap door after it falls through recess 220.

Referring to FIGS. 8A and 8B, it will be appreciated that the cam roller 274 is positioned closest to the shaft 262 when the trap door 261 is exactly one-half of the way between its clockwise rotation from a closed to an open position as shown in FIG. 8A. It will be further appreciated that the cam roller 274 is positioned farthest from the shaft 262 when the trap door 261 is exactly one-half of the way between its counterclockwise rotation from an open to a closed position as shown in FIG. 8B. In this way the maximum angular velocity of the trap door 261 going from the closed to the open position will be attained when the trap door is one-half way between the closed and open position and the maximum angular velocity of the trap door 261 going from the open to the closed position will be attained when the trap door 261 is one-half way between the open and closed position. As is appreciated, the maximum velocity of the closed-to-open movement is greater than the maximum velocity of the open-to-closed movement.

As the shaft 262 is fixedly connected to the second rectangular member 280, the shaft 262 will responsively rotate with the rectangular member 280. The shaft 262 is fixedly connected to the trap door 261 (FIG. 6), so the trap door 261 will move through the same angle C' (50°) equal to the arcuate path C' (50°) of the second rectangular member 280, as shown in FIG. 8. It will be appreciated, therefore, that a 130° rotation of the shaft 270c will cause clockwise rotation of about 50° of the trap door 261 so that trap door 261 will move from the closed position shown in FIG. 8 wherein the trap door 261 is disposed in recess 220 to the open position shown in FIG. 8 wherein the trap door 261 is moved away from recess 220. A further 230° rotation of the shaft 270c will cause counterclockwise rotation of about 50° of the trap door 261 so that trap door 261 will move from the open position shown in FIG. 8 wherein the trap door 261 is moved away from recess 220 to the closed position shown in FIG. 8 wherein the trap door is disposed in the recess 220.

Referring now back to FIGS. 4 and 6, the trap door 261 itself is mounted beneath the fixed platform 200. The trap door 261 consists of a first member 290 which is fixedly connected to the shaft 262 (the shaft 262 extending through the fixed platform as shown in FIG. 6). The first member 290 is fixedly connected to a second member 291 as by welding. A rotatable platform 292 is mounted on a shaft 293 which extends through second member 291. The shaft 293 is the output of a drive means consisting of a motor 294 and gearbox 294a similar to motor 270 and gearbox 270b of the first trap door means 250. It will be appreciated then that a turntable means 295 is provided which will cause rotation of the rotatable platform 292. This is so a glass container resting on the rotatable platform 292 will also be rotated about the axis of the rotatable platform 292 so that its UPC code can be exposed to the laser scanner 130 mounted in the enclosure (FIG. 2).

Referring again to FIG. 6, the rotatable platform 292 will move in and out of recess 220. The top surface 292a of rotatable platform 292 is co-planar with the top surface 200a of fixed platform 200 so as to facilitate a glass container being rotated to rest on the rotatable platform 292 without being knocked over due to differing heights between the top surface 200a of fixed platform 200 and the top surface 292a of rotatable platform 292.

Referring generally to FIGS. 4–8, the trap door means 250 operates as follows. The glass container placed through the customer access opening 40 and into one of the glass receiving recess is rotated by carousel 144 so that glass container rests on the top surface 292a and is supported by rotatable platform 292. The turntable means 295 is then activated so that the glass container is rotated about the axis of the rotatable platform 292. This will insure that the UPC of the glass container is exposed to the laser scanner 130. The laser scanner 130 will read the UPC code and transmit an electrical signal to the controller assembly 132. If the glass container is to be rejected by the apparatus, the controller assembly 132 will send an electrical signal to energize the motor 270 which will in turn cause the trap door 261 to move out from under the glass container, allowing the glass container to fall by gravity through the recess 220 and down from the carousel 144 for further processing as will be explained hereinafter. The motor 270 will then cause the trap door 261 to return back into recess 220 so that rotatable platform 292 can receive another glass container.

Referring again to FIG. 6, a coil spring 297 is disposed on the upper section of shaft 262. The coil spring 297 biases the shaft 262 in the direction of the trap door 261 engaging into recess 220. There are coil springs 297a and 297b similar to coil spring 297 on each trap door means 251 and 252, respectively (FIG. 4). These coil springs insure that when the motor, such as motor 270, is not energized that the trap door 261 is maintained in a closed position. These coil springs insure that the slack in each of the trap door means 250, 251 and 252 will be in one direction which will insure smooth motion of the respective trap doors without backlash. This will minimize shock and wear of the trap door means 250, 251 and 252 as well as minimize the amount of noise made by the apparatus.

Trap door means 251 and 252 operate identically to first trap door means 250, except neither of these trap door means 251 and 252 include a turntable means 295 such as found on trap door means 250. The trap doors of the trap door means 251 and 252 have a fixed table connected thereto as opposed to a rotatable table 292 and turntable means 295 as was present in trap door means 250. The trap door means 251 and 252 are shown in FIGS. 4 and 7.

Referring particularly to FIGS. 4 and 7, trap door means 251 is operatively associated with recess 221 of the fixed platform 200 and trap door means 252 is operatively associated with recess 222 of the fixed platform 200. As with trap door means 250, the trap door means 251 and 252 move from a closed position in which the trap door is engaged into the recess so that a container is supported by the trap door over the recess to an open position where the trap door is moved out from under the glass container and out of the recess to allow the glass container to fall through the recess for further processing.

It will be appreciated that the trap door means 250, 251 and 252 control processing of the glass container through the apparatus. If trap door means 250 is moved away from first recess 220, a glass container will fall by gravity through reject chute 120 to be returned to the customer through access opening 41. If trap door means 251 is moved away from second recess 221 while a glass container is resting on the non-rotatable table associated with the trap door of trap door means 251, the glass container will fall through second recess 221. If trap door means 252 is moved away from third recess 222 while a glass container is resting on the non-rotatable table associated with the trap door means 252, the glass container will fall through recess 222. If the glass container has still not fallen through the fixed platform 200, it will then fall through hole 215 in the fixed platform 200. It will be appreciated that hole 215 is not guarded by any trap door means.

Referring back to FIG. 2, chutes 300, 301 and 302 each have a top portion underlying second recess 221, third recess 222 and circular hole 215, respectively. The bottom portions of chute 300, 301 and 302 are attached to the glass container engaging apparatus 310. The glass container engaging apparatus 310 is mounted in the enclosure by means of brackets 307 and 308 which are attached to enclosure walls 24 and 26, respectively. Thus, glass containers which fall through first recess 220 are deposited in the reject chute 120; glass containers which fall through the second recess 221 are deposited in chute 300; glass containers which fall through the third recess are deposited in chute 301; and glass containers which fall through hole 215 are deposited in chute 302.

Figure 11:
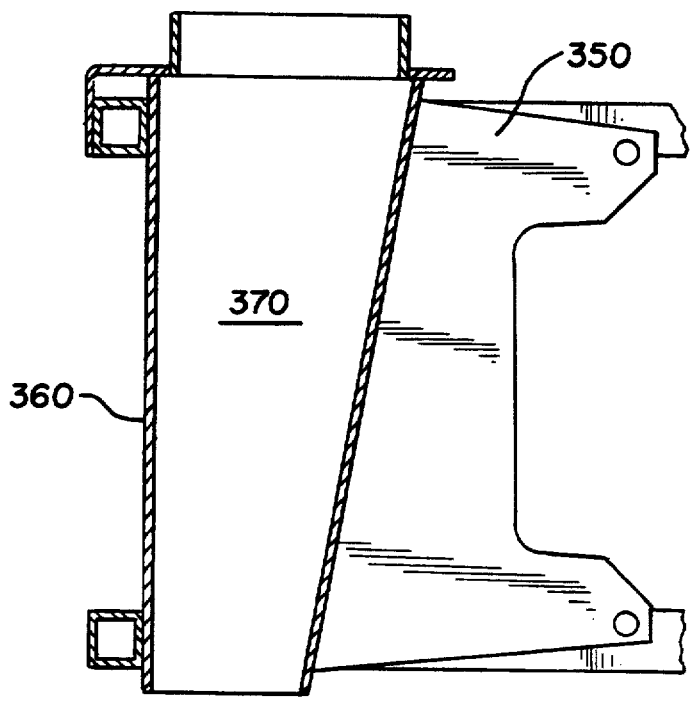
FIG. 11 is a cross-sectional view taken along the lines 11—11 of FIG. 10.
Figure 12:
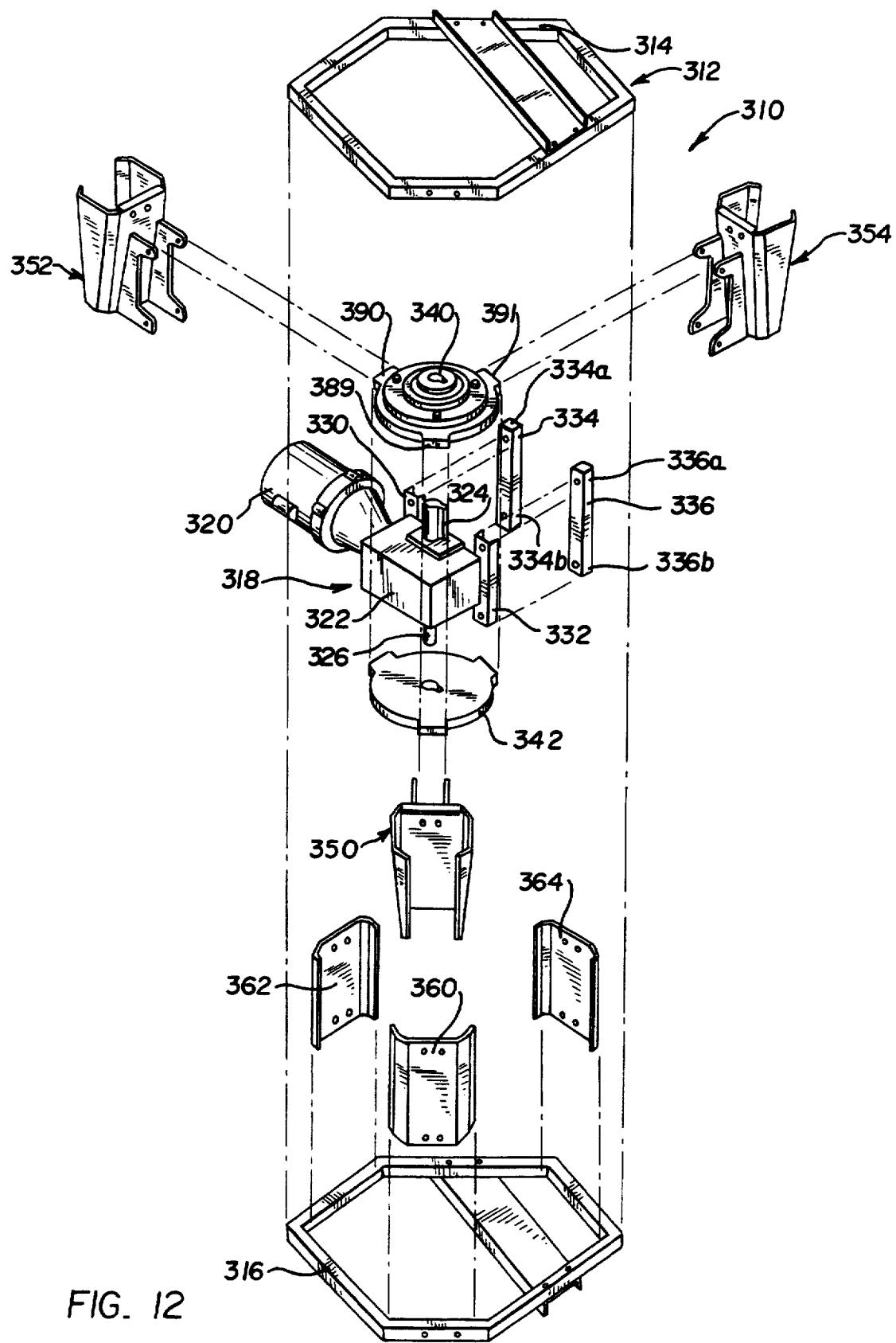
FIG. 12 is an exploded perspective view of the glass container engaging apparatus shown in FIG. 9.

Referring particularly to FIGS. 9–13, the glass container engaging apparatus 310 consists of a frame 312 comprised of upper framing member 314 and lower framing member 316. Drive means 318, consisting of a motor 320 which is connected to a gear reducer 322 having two output shafts 324 and 326, is mounted in the frame 312 by means of brackets 330 and 332 which are attached to vertical members 334 and 336 (FIG. 12). Vertical members 334 and 336 each have an upper portion 334a and 336a attached to upper framing member 314 and a lower portion 334b and 336b attached to lower framing member 316.

Two converting means 340 and 342 are provided. Converting means 340 is mounted on output shaft 324 and converting means 342 is mounted on output shaft 326 (FIG. 12). These converting means 340 and 342 convert the rotary motion of the output shafts 324 and 326 into an eccentric motion as will be explained hereinafter with respect to FIG. 13. Movable jaws 350, 352 and 354 are attached to the converting means 340 and 342. Stationary jaws 360, 362 and 364 are attached to the upper and lower framing members. Each movable jaw 350, 352 and 354 along with its respective stationary jaw 360, 362 and 364 forms a glass container receiving throat 370, 372 and 374 (see FIG. 10). The movement of movable jaws 350, 352 and 354 with respect to the stationary jaws 360, 362 and 364 either (i) crushes the glass container or (ii) retards the dropping speed of glass container as it falls through throats 370, 372 and 374.

A torque arm 375 (FIGS. 9 and 10) is provided which has one end 376 attached to drive means 318 and its other end 377 attached to back wall 22 of the enclosure. The torque arm 375 includes a flexible coupling 378 which is intermediate ends 376 and 377. The torque arm 375 resists rotary motion of the apparatus and also produces the desired motion of the movable jaws as will be explained hereinafter with respect to FIG. 13.

FIG. 13 shows a detailed cross-sectional view of converting means 340. Converting means 342 is similar in structure and operation so only converting means 340 will be discussed in detail. The rotary shaft 324 is eccentrically mounted in an eccentric bushing 380. The eccentric bushing 380 is surrounded by the inner bearing race 382. Bearing rollers 384 are disposed between the inner bearing race 382 and outer bearing race 386. The non-rotating yoke 388 of the converting means 326 has three connecting flanges 389, 390 and 391. The three connecting flanges 389, 390 and 391 are connected to respective movable jaws 350, 352 and 354 (see FIG. 12). As will be appreciated, the shaft 324 rotates about axis "A" thus causing eccentric bushing 380 and inner bearing race 382 to rotate about point "A". The center of the bearings and yoke assembly, however, is at point "B". The outer bearing race 386 and the non-rotating yoke 388 are restrained from rotating by the torque arm 375. The non-rotating yoke 388 and the outer bearing race 386 moves about planetary circle of rotation "C" thus producing the movement of movable jaws 350, 352 and 354. As a result, when the shaft rotates axially, the eccentric mounting of the bushing causes sequential radial movement of the movable jaws 350, 351 and 352, thereby applying a crushing action. An advantage of the mechanism is that the full power of the system is applied to each crusher sequentially.

By way of example, and not as a limitation, the rotational speed of the shaft and eccentric bushing is approximately 38 rpm and the amount of eccentricity is approximately 0.150 inches. This produces a planetary circle "C" of about 0.300 inches in diameter.

As shown in FIG. 11, the movable jaw means 350 is angled with respect to the stationary jaw means 300 in order to form the downwardly converging glass container receiving throat 370. This design will facilitate engagement of different sizes of glass containers and will also facilitate effective crushing of the glass containers. It will be appreciated that glass containers placed in the throat 370 will be crushed by the movement of movable jaw 350 relative to stationary jaw 360.

FIG. 14 shows another embodiment of the engaging apparatus whereby resilient pad means 396 are placed on the movable jaw 350 and stationary jaw 360 so that the apparatus can receive "returnable" glass containers. In this embodiment, the glass containers in the throat 370 will not be crushed, but instead, their dropping speed through the throat 370 will be retarded. The resilient pad means 396 are preferably made of a material that has the property of having a slow recovery to its original shape. The glass container disposed in the throat 370 will fall incrementally through the throat as it is engaged by the resilient pad means 396. This will facilitate deposit of the returnable containers into the storage bins.

Referring to FIGS. 2 and 15, three storage bins 450, 452 and 454 underlie the glass container engaging apparatus 310. Storage bin 450 receives glass containers from or glass cullet which is created by (depending on whether or not resilient pad means 396 are used) movable jaw 354 and stationary jaw 364; storage bin 452 receives glass containers from or glass cullet which is created by movable jaw 350 and stationary jaw 360; and storage bin 454 receives glass containers from or glass cullet which is created by glass containers being crushed by movable jaw 352 and stationary jaw 362. The storage bins each have wheels, such as wheels 460 and 461 on bin 450 (FIG. 2), for portable movement thereof and each contain two handles 450a, 450b and 452a, 452b and 454a, 454b (see FIG. 15) for easy handling thereof. It will be appreciated that the storage bins 450, 452 and 454 can be different sizes or shapes or can contain equal volumes.

Returning back again to FIG. 2, the apparatus also includes sensor means 470 consisting of a light source 472 mounted on one side of the enclosure and a light source receiver 474. The sensor means 470 is the means for determining when the bins 450, 452 and 454 are full and cannot hold any more processed glass containers. The light source 472 sends a beam of light (not shown) across the top of the bins 450, 452 and 454. If a bin is full, the light beams will be broken and will not reach the light source receiver 474. The light source receiver 474 will send an electronic signal to the controller assembly 132 which will shut down the apparatus until the full bin is emptied. The controller assembly 132 will also activate the electronic sign 46 to indicate that the bin is full.

It will be appreciated that the apparatus operates as follows. After a glass container is put through customer access opening 40 and the safety door 43 shuts, the carousel 144 is rotated so that the glass container is resting on the rotatable table 292 of the first trap door means 250. As the rotatable table 292 has an upper surface 292a which is co-planar with the upper surface 200a of the fixed platform 200, the glass container is able to rest on the upper surface 292a of rotatable table 292 of trap door means 250. The glass container is then rotated about the axis of the rotatable table 292 by the turntable means 295 associated with the first trap door means 250. This will expose the UPC on the glass container to the laser scanner 130 mounted in the enclosure. Once the UPC is read by the laser scanner 130, the laser scanner 130 generates an electronic signal which is transmitted to the microprocessor in the controller assembly 112. The microprocessor searches its data bank and determines whether the glass container is acceptable to the apparatus. If the glass container is not acceptable, the trap door 261 of the trap door means 250 is moved away from recess 220. Trap door means 250 covers recess 220 of fixed platform 200. Recess 220 serves as the opening for reject chute 120. Once the trap door 261 is moved away from recess 220, the glass container is returned to the customer through reject chute 120 and customer access opening 41. In addition, if the glass container has no UPC or if the UPC cannot be read by the laser scanner 130, the trap door 261 is also moved away from recess 220, and is returned to the customer through reject chute 120 and customer access opening 41.

If the glass container is acceptable to the apparatus, the microprocessor further determines the color of the glass of the glass container. Glass containers are generally three different colors, i.e., clear, green or brown. The color of the glass container is converted into an electronic signal which is used for further processing of the glass container.

The carousel 144 is then rotated so that the acceptable glass container is resting on the second trap door means 251. As the trap door of second trap door means 251 has an upper surface which is co-planar with the upper surface of the fixed platform 200, the glass container is able to rest on the upper surface of the second trap door means 251. The second trap door means 251 covers recess 221 in the fixed platform 200 which also serves as the opening for a first chute 300 leading to the glass container engaging means 310. If for example, the first chute 300 is designed to receive clear glass containers and the glass container resting on the second trap door means 251 is a clear glass container, the microprocessor delivers an electronic signal to the second trap door means 251 so that the trap door of second trap door means 251 is moved away from recess 221. This causes the glass container to fall through recess 221 and into first chute 300 and then into throat 370 for engagement by movable jaw 350 and stationary jaw 360. If the resilient pad means 396 (FIG. 14) are not used, this means that the clear glass container will be crushed into clear glass cullet. The clear glass cullet thus created will fall into storage bin 452. It will be appreciated that the resilient pad means 396 can be used to convert the stationary/movable jaw crusher to handle "returnable" glass containers. If the glass container is not made of clear glass, the second trap door means 251 does not move and thus the non-clear container (i.e., green or brown) does not fall through recess 221.

After this, the carousel 144 is then rotated so that the glass container rests on third trap door means 252. The third trap door means 252 covers recess 222 in the fixed platform 200 which also serves as the opening for the second chute 301 leading to the glass container engaging means 310. If, for example, chute 301 is designed to receive brown glass containers and the glass container resting on the third trap door means 252 is a brown glass container, the microprocessor delivers an electronic signal to the third trap door means 252 so that the third trap door means 252 is moved away from recess 222. This causes the glass container to fall through chute 301 and then into throat 372 for engagement by movable jaw 352 and stationary jaw 362. If the resilient pad means 396 (FIG. 14) are not used, this means that the brown glass container will be crushed into brown glass cullet. The brown glass cullet thus created will fall into storage bin 454. It will be appreciated that the resilient pad means 396 can be used to convert the stationary/movable jaw crusher to handle "returnable" glass containers. If the glass container is made of green glass the third trap door means 252 does not move and the green glass container does not fall through recess 222.

The carousel 144 is then rotated so that the green glass container is disposed over hole 215. Green glass container will fall through the hole 215 and the third chute 302 and then into throat 374 for engagement into movable jaw 354 and stationary jaw 364. If the resilient pad means 396 (FIG. 14) are not used, this means that green glass container will be crushed into green glass cullet. The green glass cullet thus created will fall into storage bin 454. It will be appreciated that the resilient pad means 396 can be used to convert the stationary/movable jaw crusher to handle "returnable" glass containers. Finally, the carousel 144 will rotate back to its original position. It will be appreciated that glass containers can be placed one after the other into adjacent glass container receiving recesses 157–161. The apparatus can receive up to thirty glass containers per minute.

It will be appreciated that the recycling apparatus essentially uses a process of elimination to determine through which chute the glass container will pass. The first determination is whether the glass container is acceptable or unacceptable. Unacceptable glass containers are containers which the apparatus does not accept or those with non-readable or non-existent UPC. Acceptable containers are categorized as either clear, brown or green glass and are deposited in the respective chutes by rotating the carousel and selectively moving the respective trap door means. If the glass container does not fall through the reject chute or the first or second chute, then by necessity it will fall through hole 215. Thus, the recycling apparatus creates glass cullet which is separated by color.

It will be appreciated that after the UPC is determined and the glass container is acceptable to the apparatus and thus does not return to the customer, that it does not matter which chute receives which color of glass container. For example, instead of the above example, chute 300 could receive green glass containers, chute 301 could receive brown glass containers and chute 302 could receive clear glass containers. Currently, clear glass is most in use, thus it is preferred that the first engaging means of the glass container engaging apparatus 310 accept clear glass containers. This will result in faster processing of the glass containers.

Figure 16:
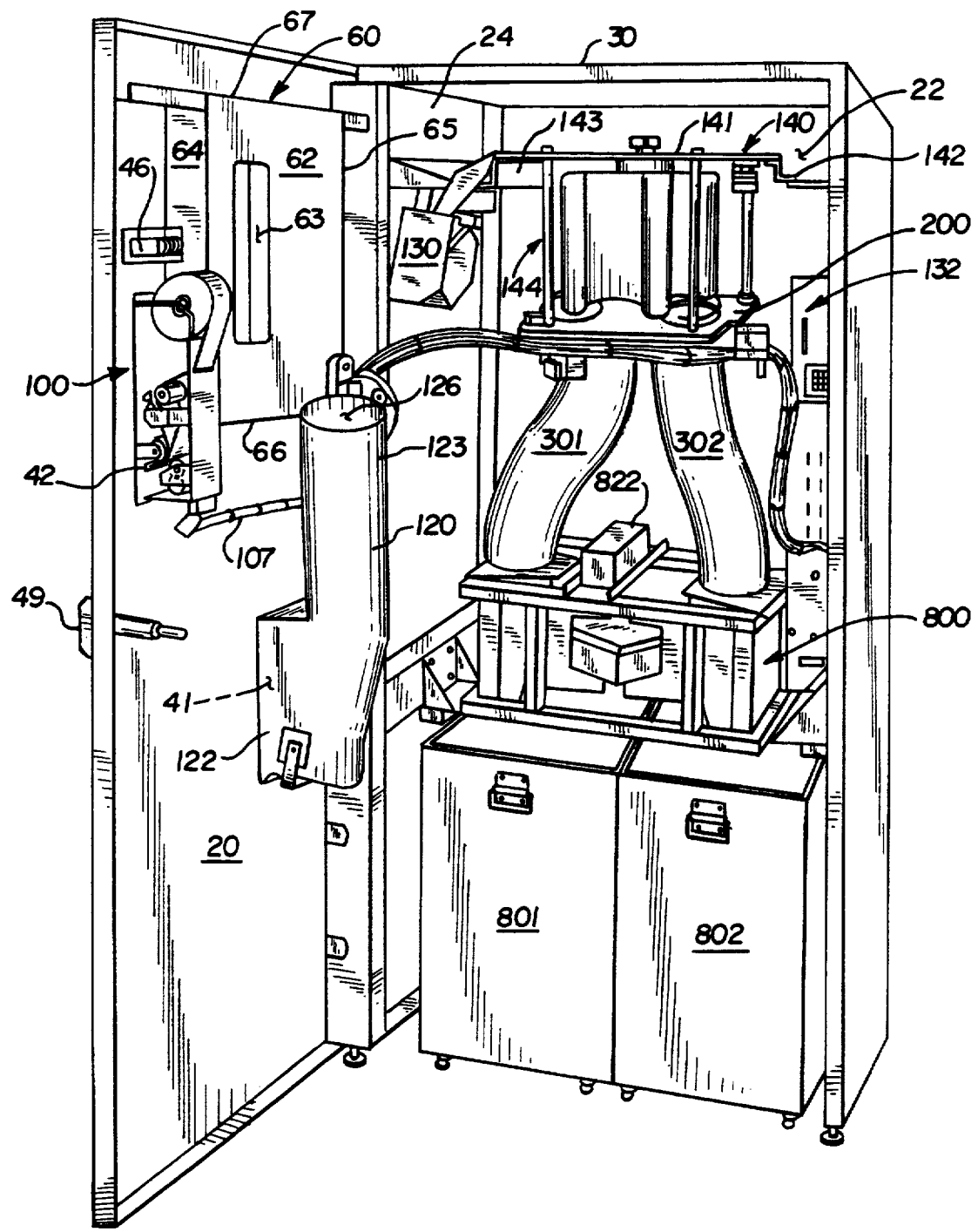
FIG. 16 is a perspective view of another embodiment of the glass recycling apparatus.

FIG. 16 shows another embodiment of the recycling apparatus. This apparatus separates clear from non-clear glass containers. In FIG. 16, like parts to those in FIG. 2 are labelled with like numbered reference characters. In the embodiment of FIG. 16, the glass container engaging apparatus 800 has only two chambers for receiving glass. Similarly, there are only three chutes (reject chute 120 and two chutes 301 and 302) and only two storage bins 701 and 702.

It will be appreciated that as the apparatus in FIG. 16 separates clear from non-clear glass containers, that one of the chutes (chute 300) and one of the trap door means (second trap door means 251) from the embodiment of the apparatus shown in FIG. 2 is not present in this apparatus. The platform 200 is also altered so that recess 221 (which is above chute 300) is not present so that the glass container placed in the carousel of the apparatus shown in FIG. 16 will not fall therethrough.

Thus, in operation, the glass container is rotated by the carousel to rest on trap door means 250. The glass container is rotated by rotatable platform 292 so that the laser scanner 130 can read the UPC code. As with the apparatus discussed above in FIGS. 1–15, if the glass container is unacceptable to the apparatus, trap door means 250 will move so that the glass container is deposited in reject chute 120 for return to the customer through customer access opening 41.

If the glass container is acceptable, the carousel is rotated to third trap door means 252. It will be appreciated that as the platform 200 does not have recess 221 and second trap door means 251, that the glass container proceeds from trap door means 250 directly to third trap door means 252. As was explained hereinbefore, third trap door means 252 covers recess 222 in the fixed platform which also serves as the opening for chute 301 leading to the glass container engaging means 800. If, for example, this chute 301 is designed to receive clear glass containers and the glass container resting on the third trap door means 252 is a clear glass container, the controller assembly 132 delivers an electronic signal to the third trap door means 252 so that it is pivoted away from recess 222. This causes the glass container to fall through recess 222 and into chute 301 for processing by the glass container engaging apparatus 800 and deposit into bin 801. If the glass container is made of non-clear (i.e., brown or green) glass, the third trap door does not move and the non-clear glass container does not fall through recess 222.

The carousel 144 is then rotated so that the non-clear glass container is disposed over hole 215. The non-clear glass container will fall through chute 302 for processing by the glass container engaging means 800 and deposit into bin 802.

It will be appreciated that although two embodiments of a glass recycling apparatus have been shown (the embodiment of FIGS. 1–15 showing a three-color system and the embodiment of FIG. 16 showing a two-color system) the invention contemplates a one color system in which a glass container is scanned to see if it is acceptable or not, and if acceptable, further processed by a glass container engaging means. For example, an apparatus in accordance with the invention could be provided whereby only clear glass containers are accepted, with all other glass containers being rejected. In this apparatus, there is only the need for one trap door means 250 over one recess 220 through which rejected glass containers fall and a second opening, such as hole 215, through which clear glass containers fall to be processed by a single glass container engaging apparatus.

It will be further appreciated that the invention contemplates eliminating the glass container engaging means, such as glass container engaging means 310 and 800 so that the glass containers are merely (i) separated by color by the carousel means 140; (ii) fall through one of the openings in fixed platform 200; and (iii) are deposited into storage bins underlying the fixed platform. 200.

Figure 17:
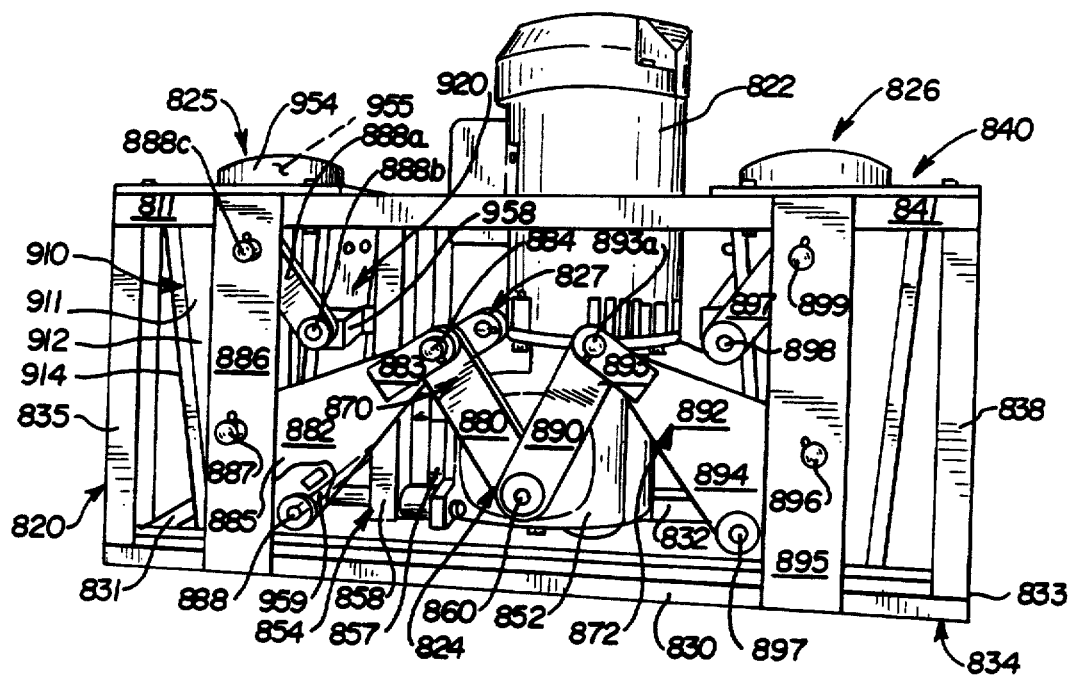
FIG. 17 is a perspective view of the glass container engaging apparatus used in the embodiment shown in FIG. 16.
Figure 18:
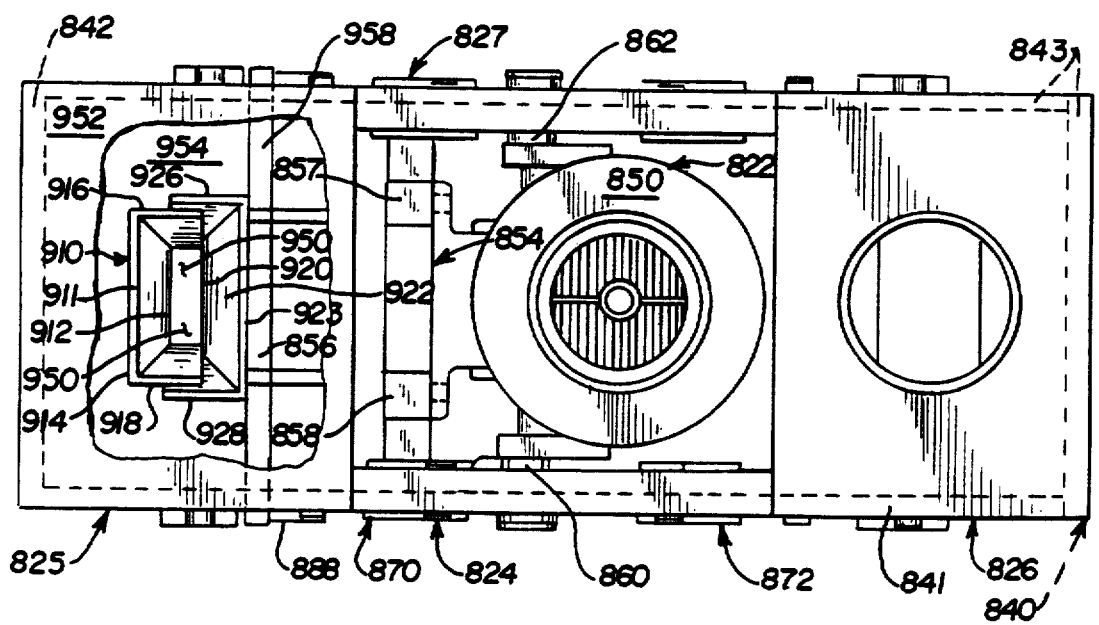
FIG. 18 is a top plan view, partially in section, of the glass container engaging apparatus of FIG. 17.

Referring now to FIGS. 17-20, the glass container engaging apparatus 800 shown in the recycling apparatus of FIG. 16 will be described. The apparatus 800 consists generally of a frame 820; drive means 822 supported by the frame 820; first linkage means 824 which connects the drive means 822 and a first crusher 825 and second crusher 826 on the front side of the apparatus and second linkage means 827 which connects the drive means 822 with the first crusher 825 and the second crusher 826 on the back side of the apparatus (FIG. 18).

The frame 820 of the apparatus consists of several supports which form an open box-shaped configuration in which the drive means 822, first and second linkage means 824, 827 and first and second crusher 825 and 826 are mounted. The frame 820 consists of four lower horizontal supports 830, 831, 832 and 833 that are welded together at their respective ends to form a lower rectangular support 834. There are four vertical supports 835, 836, 837, 838 which are also welded to the corners of the lower rectangular support 834. The four vertical supports 835-838 are in turn welded to the corners of an upper rectangular member 840 consisting of four upper horizontal supports 841, 842, 843 and 844. The drive means 822 is mounted in the frame 820 by bolting it to a subframing member 854 consisting of a horizontal crossbar 856 and two vertical supports 857, 858. The crossbar 856 and vertical supports are welded to each other and the frame 820 as shown in FIG. 17.

As can be seen by observing FIG. 18, the gear reducer 852 has two output shafts 860 and 862. Output shaft 860 is on one side of the apparatus and activates the first linkage means 824 and output shaft 862 is on the other side of the apparatus and activates the second linkage means 827. This allows for separate linkage means to operate both sides of the crushers as will be explained below.

The first linkage means 824 is shown in FIG. 17. This linkage means 824 is connected to output shaft 860 of the gear reducer 852. The first linkage means 824 is comprised of a left linkage means 870 and a right linkage means 872. The left linkage means 870 consists of a crank 880 which is eccentrically mounted to the output shaft 860, an arm 882 having a first section 883 which is pivotally mounted to the crank 880 by means of pin 884 and a second section 885 secured to the movable jaw (discussed below) of the first crusher 825 by a fastener 888 and pivotally mounted to a strut 886 by means of a pin 887. The left linkage means 870 further consists of a rocker arm 888a having a first end pivotally mounted to the movable jaw by pin 888b and a second end pivotally mounted to the strut 886 by means of a pin 888c. The strut 886 is welded to framing members 834 and 840 of the frame 820.

The right linkage means 872 is identical to the left linkage means 870. The right linkage means 872 consists of a crank 890 which is eccentrically mounted to output shaft 860, an arm 892 having a first section 893 which is pivotally mounted to the crank 890 at pin 893a and a second section 894 secured to the movable jaw (discussed hereinafter) of the second crusher by a fastener 897 and pivotally mounted to a strut 895 by means of a pin 896. The right linkage means 872 further consists of a rocker arm 897 having first end pivotally mounted to the movable jaw by pin 898 and a second end pivotally mounted by the strut 895 by means of a pin 899. The strut 895 is welded to framing members 834 and 840 of the frame 820.

Referring particularly to FIG. 18, the first crusher 825 consists of a stationary jaw 910 having a stationary jaw crusher plate 911 with an inside surface 912 and an outside surface 914. The stationary jaw 910 further consists of a first sidewall 916 and a second sidewall 918. The first 916 and second sidewalls 918 are on opposite sides of and generally perpendicular to the stationary jaw 910 crusher plate 911. The first crusher 825 further consists of a movable jaw 920 having an inside wear plate 922 and a base plate 923. The movable jaw 920 also includes a first sidewall 926 and a second sidewall 928 (FIG. 21). The first and second sidewalls 926 and 928 are on opposite sides of and generally perpendicular to the inside wear plate 922. As can be seen in FIG. 18, the stationary jaw first and second sidewalls 916 and 918 overlap the respective movable jaw first and second sidewall means 926 and 928. This will resist escape of pieces of crushed glass from the glass crusher.

Figure 19:
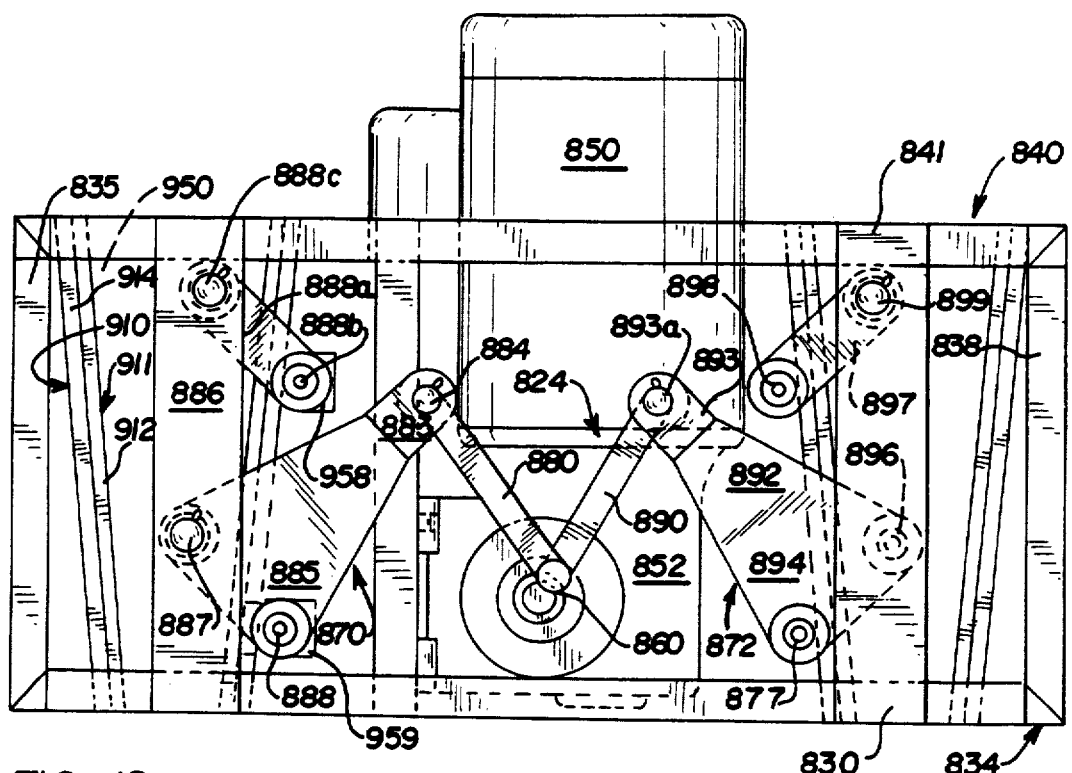
FIG. 19 is a front elevational view of the glass container engaging apparatus of FIG. 17.
Figure 20:
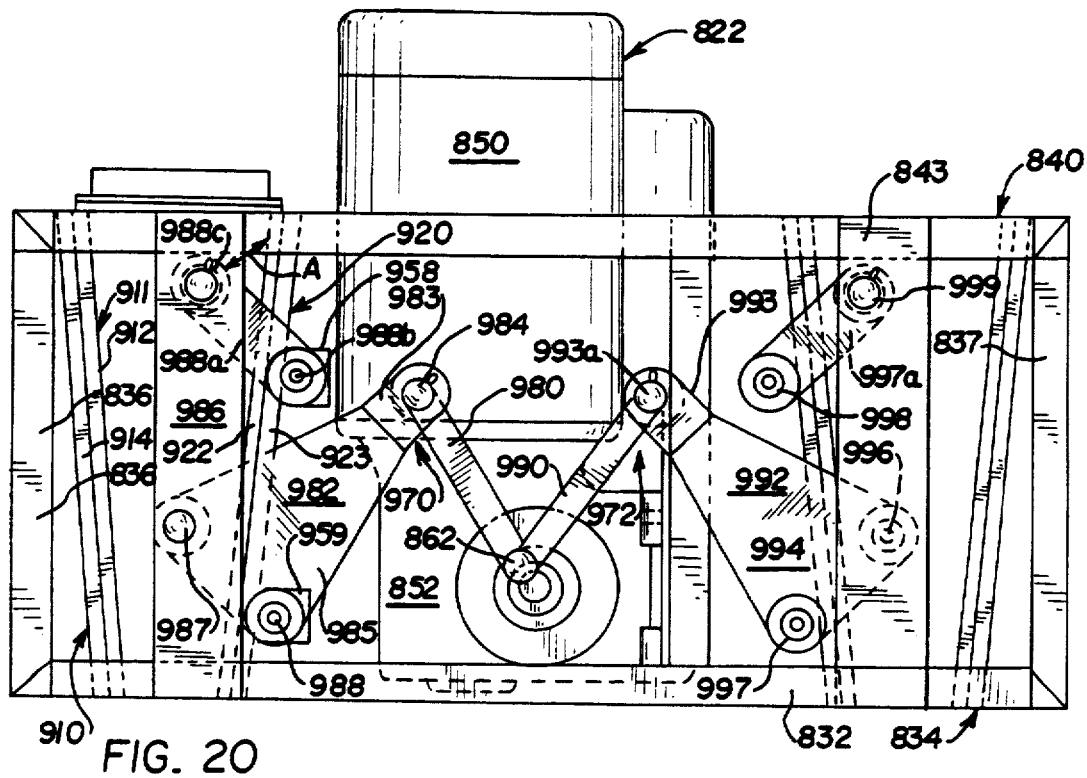
FIG. 20 is a back elevational view of the glass container engaging apparatus of FIG. 17.

As can be seen from FIGS. 18-20, the stationary jaw means 910 is inclined downwardly and inwardly and the movable jaw means 920 is also inclined downwardly and inwardly. Therefore, the stationary jaw means 910 and the movable jaw means 920 define a downwardly and inwardly converging glass container receiving throat 950. This throat 950 will not only act to feed the glass containers to be crushed downwardly in the throat but will also permit different sizes of glass containers to be crushed to fit into the throat 950. The throat 950 is also defined by a chute cover 952 (FIG. 18) having a raised annular collar 954 which defines a chute opening 955 (FIG. 17). This will further resist escape of crushed glass pieces from the first crusher 825.

The base plate of the movable jaw has an upper horizontal member 958 and a lower horizontal member 959 fixed to its outer surface. Referring to FIGS. 17-19, the horizontal member 958 joins rocker arm 888a with the rocker 988a arm on the opposite side of the crusher (FIG. 20) and horizontal member 959 joins arm 882 with the arm 882 on the opposite side of the crusher. It will be appreciated that the linkage means 824 operated by output shaft 860 is the same as the linkage means 827 operated by output shaft 862. The linkage means move in unison by virtue of the fact that they are connected by upper horizontal member 958 and lower horizontal member 959.

The second linkage means 827 is shown in FIG. 20. This linkage means 827 is connected to output shaft 862 of the gear reducer 852. The second linkage means 827 is comprised of a left linkage means 970 and a right linkage means 972. The left linkage means 970 consists of a crank 980 which is eccentrically mounted to the output shaft 862, an arm 982 having a first section 983 which is pivotally mounted to the crank 980 by means of pin 984 and a second section 985 secured to the movable jaw 910 of the first crusher by a fastener 988 and pivotally mounted to a strut 986 by means of a pin 987. The left linkage means 970 further consists of a rocker arm 988a having a first end pivotally mounted to the movable jaw by pin 988b and a second end pivotally mounted to the strut 986 by means of a pin 988c. The strut 986 is welded to framing members 834 and 840 of the frame 820.

The right linkage means 972 is similar to the left linkage means 970. The right linkage means 972 consists of a crank 990 which is eccentrically mounted to output shaft 862, an arm 992 having a first section 993 which is pivotally mounted to the crank 990 at pin 993a and a second section 994 secured to the movable jaw of the second crusher by a fastener 997 and pivotally mounted to a strut 995 by means of a pin 996. The right linkage means 972 further consists of a rocker arm 997a having first end pivotally mounted to the movable jaw by pin 998 and a second end pivotally mounted by the strut 995 by means of a pin 999. The strut 995 is welded to framing members 834 and 840 of the frame 820.

The second crusher 826 has a similar structure and operation as does the first crusher 825, thus it will not be discussed in detail.

It will be appreciated that the various linkage means creates a path of movement for the movable jaw means, such as movable jaw means 910 that has both a translational and rotational components. The path of movement of the top portion of the movable jaw means 910 is also generally parallel to the path of movement of the second portion. This is due to the eccentric mounting of the linkage means of the rotary shafts 860 and 862 of the drive means 820. Therefore, a glass container which is placed longitudinally in the converging glass container throat between the movable jaw and the stationary jaw, such as throat 850, will be forced downwardly and inwardly of the path of movement of the movable jaw means. This motion not only feeds the glass container into the throat for more thorough crushing, but also forces the paper wrapper on the glass container downwardly so that the glass container is more effectively crushed.

The movable jaw 910 and stationary jaw 911 can be provided with resilient pad means similar to resilient pad means 396 of movable jaw 350 and stationary jaw 360. This will convert the glass container crusher 825 into a glass container engaging apparatus which retards the falling speed of a returnable glass container in order to insure that the glass container will not break upon falling into the storage bins 701 and 702.

It will be appreciated that the invention contemplates only one engaging jaw means which is operated by one drive means and that the invention is not limited to providing a two or three engaging jaw means glass container engaging apparatus. A plurality of stand-alone single engaging jaw means can be provided which can be used in association with manual separation of glass containers in recycling centers, for example.

The present invention has provided an apparatus and method for recycling glass containers and more particularly, to an apparatus which accepts, separates and either deposits a returnable glass container in a bin or crushes a glass container into glass cullet which is in turn deposited in a bin. The invention also provides glass container engaging means having one, two or three engaging jaw means to engage glass containers. The engaged glass containers can either (i) be crushed into glass cullet which is in turn deposited in a storage bin or (ii) have their dropping speed retarded for subsequent deposit in a bin.

Whereas a particular embodiment of the invention has been described above, for purposes of illustration, it will be evident to those skilled in the art that numerous variations of the details may be made without departing from the invention as defined in the appended claims.

What is claimed is:

1. A glass container engaging apparatus comprising:
a frame;
drive means mounted on said frame including at least one rotary shaft;
at least one linkage means connected to a first rotary shaft;
at least one movable jaw means connected to a first said linkage means, a first said movable jaw means having a first portion and a second portion; and
at least one stationary jaw means mounted to said frame;
said first movable jaw means and a first said stationary jaw means defining a first converging glass container receiving throat;
said first linkage means converting the rotary motion of said first rotary shaft into a path of movement for said first movable jaw means;
said path of movement having both translational and rotational components and said path of movement of said first portion being generally parallel to said path of movement of said second portion, whereby a glass container which is placed longitudinally in said converging glass container receiving throat is forced downwardly and inwardly therein by said path of movement of said first movable jaw means;
a second said linkage means connected to said first rotary shaft;
a second said movable jaw means connected to said second linkage means, said second movable jaw means having a first portion and a second portion;
a second said stationary jaw means mounted to said frame;
said second movable jaw means and said second stationary jaw means defining a second converging glass container receiving throat;
said second linkage means converting the rotary motion of said first rotary shaft into a path of movement for said second movable jaw means;
said path of movement having both translational and rotational components and said path of movement of said first portion being generally parallel to said path of movement of said second portion, whereby a glass container which is placed in said second converging glass container receiving throat is forced downwardly and inwardly therein by said path of movement of said second movable jaw means;
said first and second linkage means each include:
a crank eccentrically mounted to said first rotary shaft;
a first arm having a first section pivotally mounted to said crank and a second section secured to said respective first and second movable jaw means and pivotally mounted to said frame; and
a second arm secured to said respective first and second movable jaw means and pivotally mounted to said frame.

2. The apparatus of claim 1, wherein
said first and second movable jaw means each have a base plate and a wear plate mounted on said base plate.

3. The apparatus of claim 2, wherein
said first arm is pivotally mounted to said base plate.

4. The apparatus of claim 3, wherein said second arm is pivotally mounted to said base plate.

5. The apparatus of claim 4, wherein
said wear plate of said first movable jaw means and said wear plate of said second movable jaw means contact said glass container which is desired to be crushed.

6. The apparatus of claim 5, wherein
said first stationary jaw means has a stationary jaw crusher plate, a first sidewall and a second sidewall, said first and second sidewalls being on opposite sides of and generally perpendicular to said first stationary jaw crusher plate; and
said second stationary jaw means has a stationary jaw crusher plate, a first sidewall and a second sidewall, said first and second sidewalls being on opposite sides of and generally perpendicular to said second stationary jaw crusher plate.

7. The apparatus of claim 6, wherein
said first and second movable jaw means each have a movable jaw crusher plate, a first sidewall and a second sidewall, said first and second sidewalls being on opposite sides of and generally perpendicular to said respective first and second movable jaw crusher plate.

8. The apparatus of claim 7, wherein
said first and second stationary jaw means first and second sidewalls overlap said respective first and second movable jaw means first and second sidewalls, whereby escape of pieces of crushed glass from said container receiving throat is resisted.

9. The apparatus of claim 8, including
cover means defining an entry opening disposed near one end of each said first and second converging glass container receiving throats for facilitating deposit of said glass container in said first and second converging glass container receiving throats and for resisting escape of said crushed glass from said glass container engaging apparatus.

10. The apparatus of claim 9, wherein
said first and second converging glass container receiving throat converging downwardly and inwardly from its upper end to its lower end, said glass container to be crushed being placed in said upper end and said pieces of crushed glass exiting said first and second converging glass container receiving throat at said lower end.

11. The apparatus of claim 10, wherein
said drive means has a second said rotary shaft.

12. The apparatus of claim 11, including
a third said linkage means connecting said second rotary shaft to said first movable jaw means, said third linkage means having means for converting the motion of said second rotary shaft into a path of movement for said first movable jaw means having both translational and rotational components and said path of movement of said first portion being generally parallel to said path of movement of said second portion.

13. The apparatus of claim 12, including
a fourth said linkage means connecting said second rotary shaft to said second movable jaw means, said fourth linkage means having means for converting the motion of said second rotary shaft into a path of movement for said second movable jaw means having both translational and rotational components and said path of movement of said first portion being generally parallel to said path of movement of said second portion.

14. The apparatus of claim 1, including
first resilient pad means mounted to said first movable jaw means; and
second resilient pad means mounted to said first stationary jaw means, whereby glass containers which are engaged by said first engaging jaw means have their dropping speed retarded by said first and second resilient pad means engaging said glass containers so that breakage of said glass containers is resisted.

* * * * *

UNITED STATES PATENT AND TRADEMARK OFFICE
CERTIFICATE OF CORRECTION

PATENT NO. : 5,372,317
DATED : December 13, 1994
INVENTOR(S) : W. Coy Willis

It is certified that error appears in the above-identified patent and that said Letters Patent is hereby corrected as shown below:

Column 1, line 46, "Pat. No. 4,258,426" should be -- Pat. No. 4,285,426 --.

Column 2, line 26, the second occurrence of "and" should be -- and --.

Column 14, line 20, "112" should be -- 132 --.

Signed and Sealed this

Fourth Day of July, 1995

Attest:

BRUCE LEHMAN

Attesting Officer

Commissioner of Patents and Trademarks